US012772186B2

(12) United States Patent
Lei et al.

(10) Patent No.: US 12,772,186 B2
(45) Date of Patent: Oct. 20, 2026

(54) SYNC RASTER CONFIGURATION FOR CELL SEARCH

(71) Applicant: QUALCOMM Incorporated, San Diego, CA (US)

(72) Inventors: Jing Lei, San Diego, CA (US); Gene Fong, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 18/299,673

(22) Filed: Apr. 12, 2023

(65) Prior Publication Data

US 2023/0397138 A1 Dec. 7, 2023

Related U.S. Application Data

(60) Provisional application No. 63/365,768, filed on Jun. 2, 2022.

(51) Int. Cl.

| | |
|---|---|
| ***H04W 56/00*** | (2009.01) |
| ***H04J 11/00*** | (2006.01) |
| ***H04L 27/26*** | (2006.01) |
| ***H04W 48/20*** | (2009.01) |

(52) U.S. Cl.

CPC ..... *H04W 56/0015* (2013.01); *H04J 11/0069* (2013.01); *H04L 27/2605* (2013.01); *H04W 48/20* (2013.01)

(58) Field of Classification Search

None

See application file for complete search history.

(56) References Cited

U.S. PATENT DOCUMENTS

| | | | | |
|---|---|---|---|---|
| 11,337,169 | B2 * | 5/2022 | Jung | H04J 11/0069 |
| 11,943,723 | B2 * | 3/2024 | Jung | H04W 56/0005 |
| 12,057,927 | B2 * | 8/2024 | Lovlekar | H04J 11/0073 |

FOREIGN PATENT DOCUMENTS

| | | | | |
|---|---|---|---|---|
| EP | 4096306 A1 | | 11/2022 | |
| EP | 4156584 A1 | * | 3/2023 | H04L 5/005 |
| ES | 2232842 T3 | * | 6/2005 | G10L 19/0208 |
| WO | WO-2021148356 A1 | * | 7/2021 | H04W 16/14 |
| WO | WO-2021149255 A1 | * | 7/2021 | H04W 16/14 |

OTHER PUBLICATIONS

International Search Report and Written Opinion—PCT/US2023/018499—ISA/EPO—Jul. 28, 2023.

* cited by examiner

*Primary Examiner* — Gerald A Smarth

(74) *Attorney, Agent, or Firm* — Procopico, Cory, Hargreaves & Savitch LLP

(57) ABSTRACT

A UE performs a cell search based on a synchronization raster in an operating band in frequency, the synchronization raster having a valid range and an SSB search with a step size greater than one based on a channel raster range of a channel raster within the operating band, a duplex mode of the operating band, a bandwidth of an SSB, and a minimum guard band size, and select a cell based on the cell search. A network node may be configured to transmit an SSB for a cell at a frequency based on a synchronization raster in an operating band, the synchronization raster having a valid range based on a channel raster range of a channel raster within the operating band, a duplex mode of the operating band, a bandwidth of the SSB, and a minimum guard band size, and communicate with at least one UE via the cell.

30 Claims, 15 Drawing Sheets

SYNC RASTER CONFIGURATION FOR CELL SEARCH

CROSS REFERENCE TO RELATED APPLICATION(S)

This application claims the benefit of and priority to U.S. Provisional Application Ser. No. 63/365,768, entitled "Sync Raster Configuration for Cell Search" and filed on Jun. 2, 2022, which is expressly incorporated by reference herein in its entirety.

TECHNICAL FIELD

The present disclosure relates generally to communication systems, and more particularly, to a method of wireless communication including a configuration of sync (synchronization) raster configuration for cell search.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to perform a cell search based on a synchronization raster in an operating band in frequency, the synchronization raster having a valid range and a synchronization signal and physical broadcast channel (PBCH) block (SSB) search with a step size greater than one based on a channel raster range of a channel raster within the operating band, a duplex mode of the operating band, a bandwidth of an SSB, and a minimum guard band size. The apparatus may be configured to select a cell based on the cell search.

In an aspect of the disclosure, a method, a computer-readable medium, and an apparatus are provided. The apparatus may be configured to transmit an SSB for a cell at a frequency based on a synchronization raster in an operating band, the synchronization raster having a valid range based on a channel raster range of a channel raster within the operating band, a duplex mode of the operating band, a bandwidth of the SSB, and a minimum guard band size. The apparatus may be configured to communicate with at least one UE via the cell.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
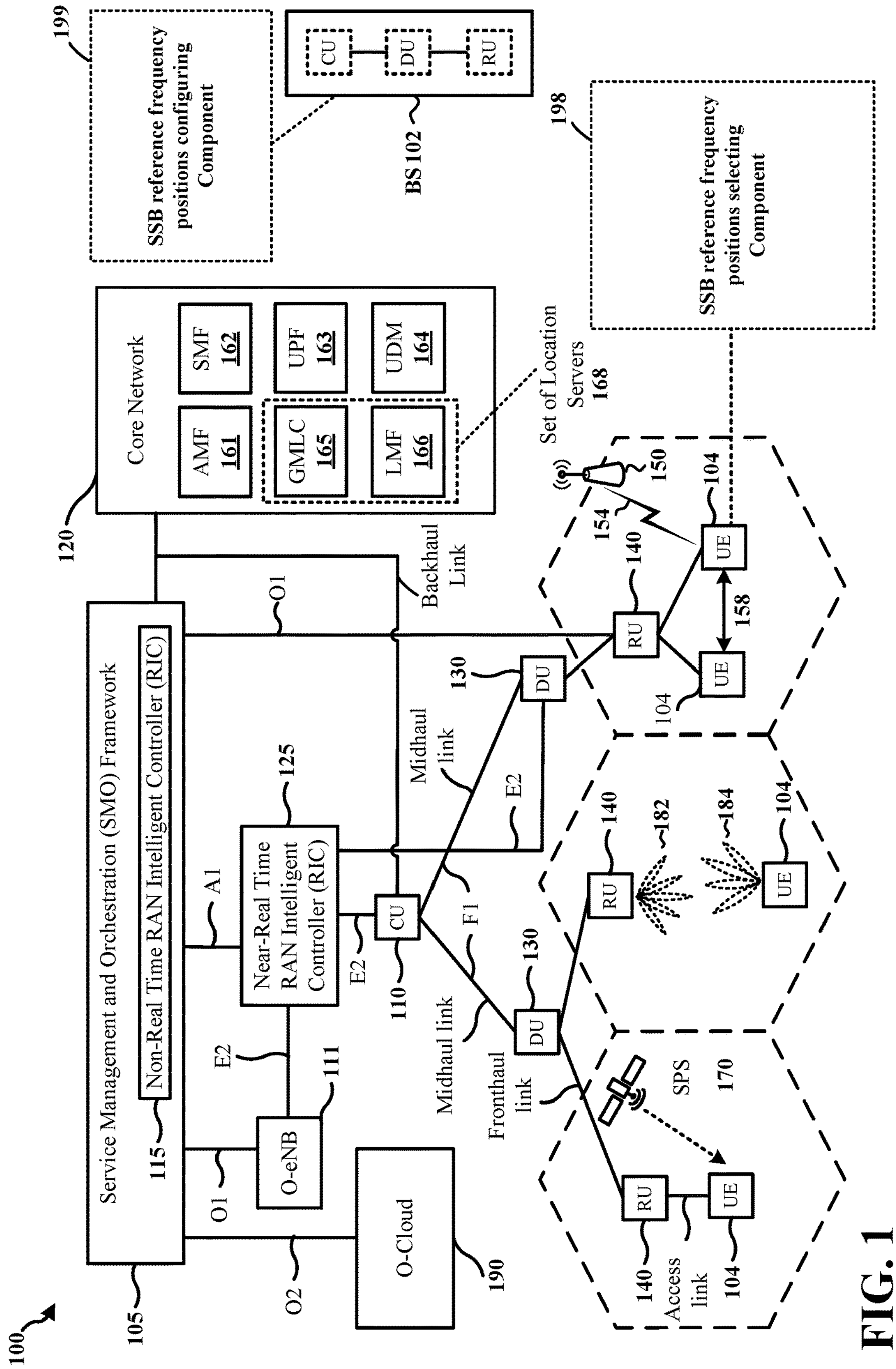
FIG. 1 is a diagram illustrating an example of a wireless communications system and an access network.

Based on some aspects of the current disclosure, a set of valid synchronization signal and physical broadcast channel (PBCH) block (SSB) reference frequency positions that improves cell search simplicity for a UE, while maintaining network deployment flexibility. For example, the set of valid SSB frequency positions may be based on a step size of the sync rasters and an offset of the sync raster. The step size of the sync rasters may be configured based on the channel raster range of the channel raster within the operating band, the duplex mode of the operating band, the bandwidth of the SSB, the minimum guard band size, and a granularity of the sync raster. The offset of the sync raster may be configured to shuffle, or adjust, the starting point of the set of valid SSB reference frequency positions to minimize the number of samples that are outside the global synchronization number (GSCN) interval of the minimum channel bandwidth.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.)

may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an SSB reference frequency positions selecting component 198 configured to perform a cell search based on a synchronization raster in an operating band in frequency, the synchronization raster having a valid range and a step size based on a channel raster range of a channel raster within the operating band, a duplex mode of the operating band, a bandwidth of an SSB, and a minimum guard band size, and select a cell based on the cell search. In certain aspects, the base station 102 may include an SSB reference frequency positions configuring component 199 configured to transmit an SSB for a cell at a frequency based on a synchronization raster in an operating band, the synchronization raster having a valid range based on a channel raster range of a channel raster within the operating band, a duplex mode of the operating band, a bandwidth of the SSB, and a minimum guard band size, and communicate with at least one UE via the cell. Although the following description may be focused on 5G NR, the concepts described herein may be applicable to other similar areas, such as LTE, LTE-A, CDMA, GSM, and other wireless technologies.

Figures 2A, 2B, 2C, 2D:
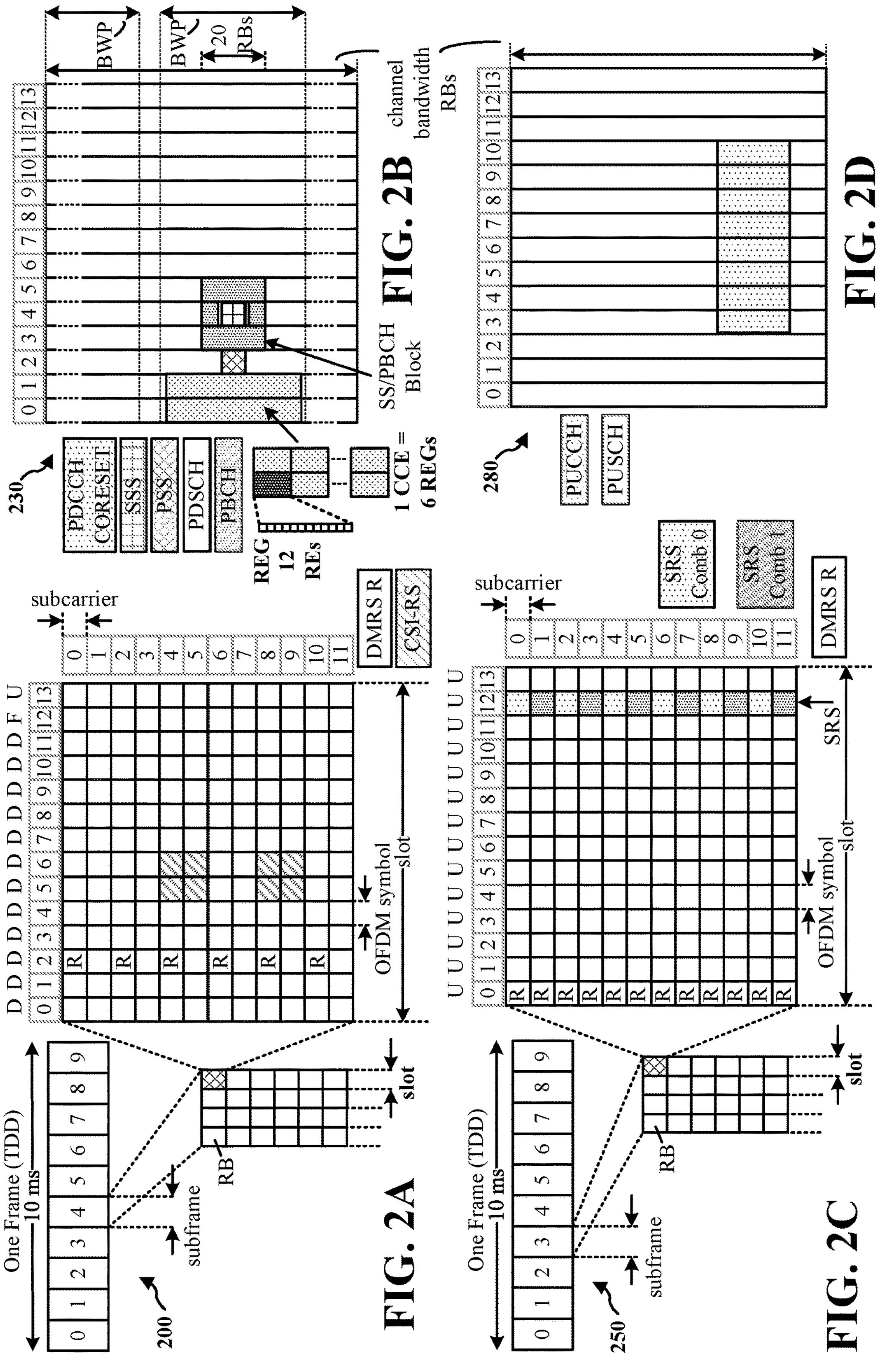
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (B SR), a power headroom report (PHR), and/or UCI.

Figure 3:
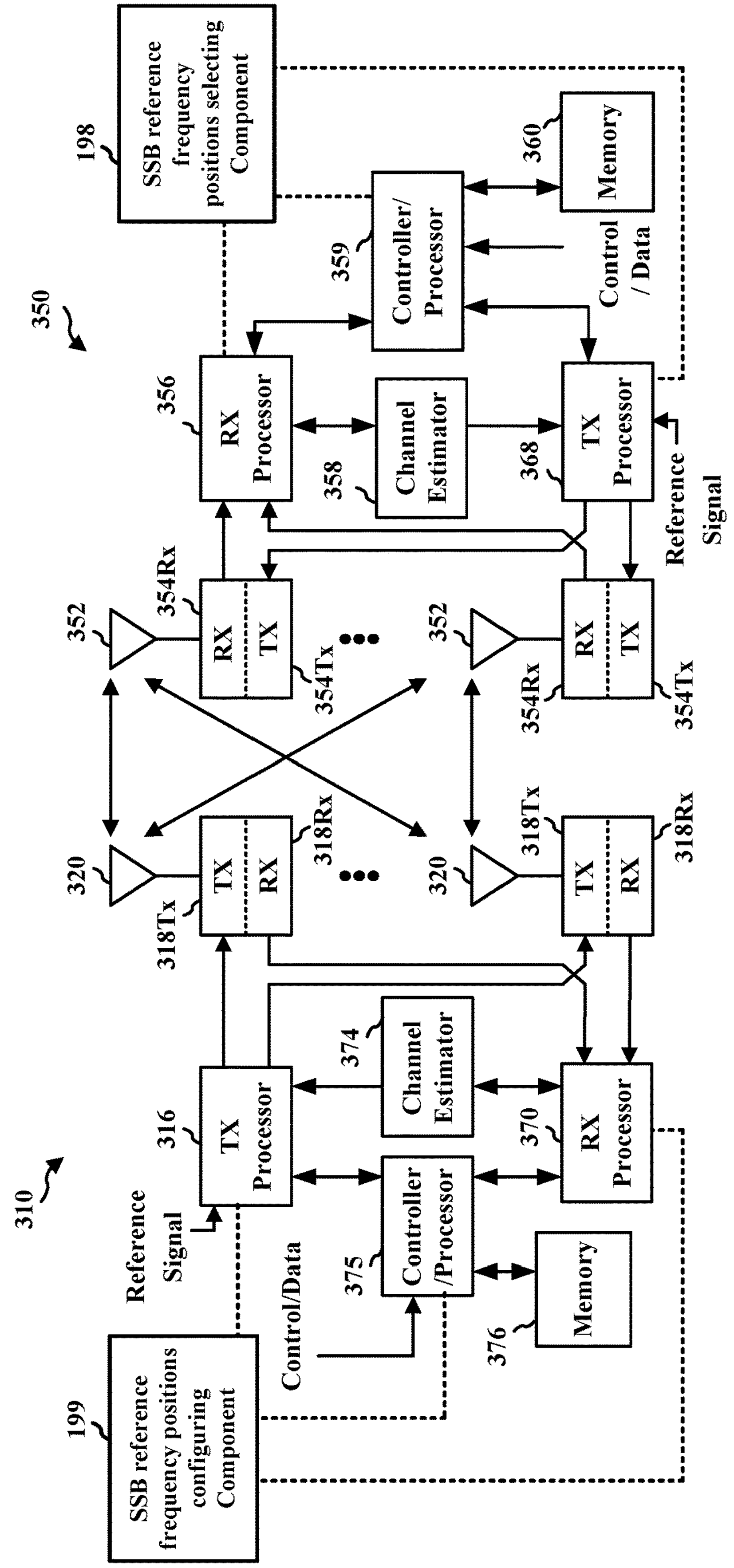
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the SSB reference frequency positions selecting component 198 of FIG. 1. At least one of the TX processor 316, the RX processor 370, and the controller/processor 375 may be configured to perform aspects in connection with the SSB reference frequency positions configuring component 199 of FIG. 1.

Frequency bands that have been used for one radio access technology (RAT) may be reused for a second RAT. As an example, an LTE time division duplex (TDD) and/or frequency division duplex (FDD) operating band may be used to support NR wireless communication, such as a standalone deployment of NR.

In some aspects, new TDD frequency bands may be added to the FR1 licensed frequency spectrum and/or to the FR2-2 shared frequency spectrum associated with the standalone deployment of the NR. For example, an additional frequency spectrum above 7 GHz and below 24 GHz may be added for mobile communications. The frequency scanning and cell search, e.g., frequency scanning and cell search in NR, in the newly added frequency bands of mobile communications may be based on a channel raster and a synchronization raster. In one aspect, the operating bands of licensed/shared spectrum may follow the range and granularity defined by the channel raster. In another aspect, the synchronization and broadcast channels carrying a cell ID for cell searches may be transmitted on a frequency grid compliant with the synchronization raster structure. In another aspect, the channel raster and the synchronization raster may be mapped to different sets of frequency resources and may have different granularities or step sizes in the frequency domain.

A raster may refer to a collection of frequency positions. The raster may include a global channel raster, a channel raster, or a synchronization (sync) raster. At least some parameters or configurations of the global channel raster, the channel raster, or the sync raster may be defined for the network node and/or user equipments (UEs).

The global frequency channel raster may define a set of RF reference frequencies, which may be used in signaling to identify the position of RF channels, SS blocks, and/or other elements. In some aspects, a global frequency raster may be defined for all frequencies, e.g., from 0 to 100 GHz. The granularity of the global frequency raster may be referred to as $\Delta F_{Global}$. The RF reference frequencies may be designated by an NR Absolute Radio Frequency Channel Number (NR-ARFCN) in the range of (0 . . . 2016666) for FR1 or (2016667 . . . 3279165) for FR2 on the global frequency raster. The relation between the NR-ARFCN and the RF reference frequency $F_{REF}$ in MHz may be represented as $F_{REF}=F_{REF\text{-}Offs}+\Delta F_{Global}(N_{REF}-N_{REF\text{-}Offs})$ or $$N_{REF} = \frac{(F_{REF} - F_{REF\text{-}Offs})}{\Delta F_{Global}} + N_{REF\text{-}Offs},$$

where, $N_{REF}$ may refer to the NR-ARFCN and $N_{REF\text{-}Offs}$ and $F_{REF\text{-}Offs}$ may be provided in table A.

TABLE A

| Frequency range (MHz) | $\Delta F_{Global}$ | $F_{REF\text{-}Offs}$ (MHz) | $N_{REF\text{-}Offs}$ | Range of $N_{RE}$ |
|---|---|---|---|---|
| 0-3000 | 5 | 0 | 0 | 0-599999 |
| 3000-24250 | 15 | 3000 | 600000 | 600000-2016666 |

The channel raster may define a subset of RF reference frequencies that can be used to identify the RF channel position in the uplink and downlink. The RF reference frequency for an RF channel may map to a resource element on the carrier. For each operating band, a subset of frequencies from the global frequency raster are applicable for that band and forms a channel raster with a granularity $\Delta F_{Raster}$, which may be equal to or larger than $\Delta F_{Global}$, as provided in table B

TABLE B

| NR operating band | $\Delta F_{Raster}$ (kHz) | Uplink Range of $N_{REF}$ (First-<Step size>-Last) | Downlink Range of $N_{REF}$ (First-<Step size>-Last) |
|---|---|---|---|
| n1 | 100 | 384000-<20>-396000 | 422000-<20>-434000 |
| n2 | 100 | 370000-<20>-382000 | 386000-<20>-398000 |
| n3 | 100 | 342000-<20>-357000 | 361000-<20>-376000 |
| n5 | 100 | 164800-<20>-169800 | 173800-<20>-178800 |
| n7 | 100 | 500000-<20>-514000 | 524000-<20>-538000 |
| n8 | 100 | 176000-<20>-183000 | 185000-<20>-192000 |
| n12 | 100 | 139800-<20>-143200 | 145800-<20>-149200 |
| n14 | 100 | 157600-<20>-159600 | 151600-<20>-153600 |
| n18 | 100 | 163000-<20>-166000 | 172000-<20>-175000 |
| n20 | 100 | 166400-<20>-172400 | 158200-<20>-164200 |
| n25 | 100 | 370000-<20>-383000 | 386000-<20>-399000 |
| n26 | 100 | 162800-<20>-169800 | 171800-<20>-178800 |
| n28 | 100 | 140600-<20>-149600 | 151600-<20>-160600 |
| n29 | 100 | N/A | 143400-<20>-145600 |
| n30 | 100 | 461000-<20>-463000 | 470000-<20>-472000 |

The sync raster may indicate the frequency positions of the synchronization block that can be used by the UEs for system acquisition when explicit signaling of the SSB position is not present. A global synchronization raster may be defined for all frequencies. The frequency position of the SSB may be defined as SSB reference frequency position ($SSB_{REF}$) with corresponding global synchronization channel number (GSCN). The parameters defining the $SSB_{REF}$ and GSCN may be specified for at least some frequency ranges as provided in table C.

TABLE C

| Frequency range | SS Block frequency position $SSB_{REF}$ | GSCN | Range of GSCN |
|---|---|---|---|
| 0-3000 | N * 1200 kHz + M * 50 kHz | 3N + (M-3)/2 | 2-7498 |
| 3000-24250 | 3000 MHz + N * 1.44 MHz | 7499 + N | 7499-22255 |

In one example, the sync raster for each band may be provided as table D.

TABLE D

| NR operating band | SS Block SCS (kHz) | SS Block pattern | Range of GSCN (First-<Step size>-Last) |
|---|---|---|---|
| n1 | 15 | Case A | 5279-<1>-5419 |
| n2 | 15 | Case A | 4829-<1>-4969 |
| n3 | 15 | Case A | 4517-<1>-4693 |
| n5 | 15 | Case A | 2177-<1>-2230 |
| | 30 | Case B | 2183-<1>-2224 |
| n7 | 15 | Case A | 6554-<1>-6718 |
| n8 | 15 | Case A | 2318-<1>-2395 |
| n12 | 15 | Case A | 1828-<1>-1858 |
| n14 | 15 | Case A | 1901-<1>-1915 |
| n18 | 15 | Case A | 2156-<1>-2182 |
| n20 | 15 | Case A | 1982-<1>-2047 |
| n25 | 15 | Case A | 4829-<1>-4981 |
| n26 | 15 | Case A | 2153-<1>-2230 |
| n28 | 15 | Case A | 1901-<1>-2002 |
| n29 | 15 | Case A | 1798-<1>-1813 |
| n30 | 15 | Case A | 5879-<1>-5893 |

The base station may transmit the SSBs on multiple frequency locations, e.g., the sync raster. FIG. 2B illustrates an example of an SSB. The sync raster may indicate the frequency positions of the SSB that can be used by the UE for system acquisition. That is, the sync raster may be associated with a set of center frequencies, and the base station may transmit the SSBs on multiple frequency locations, each frequency location of the multiple frequency locations being associated with one center frequency of the set of center frequencies. The UE may monitor the sync raster to receive the SSBs transmitted by the base station.

Figure 4A:
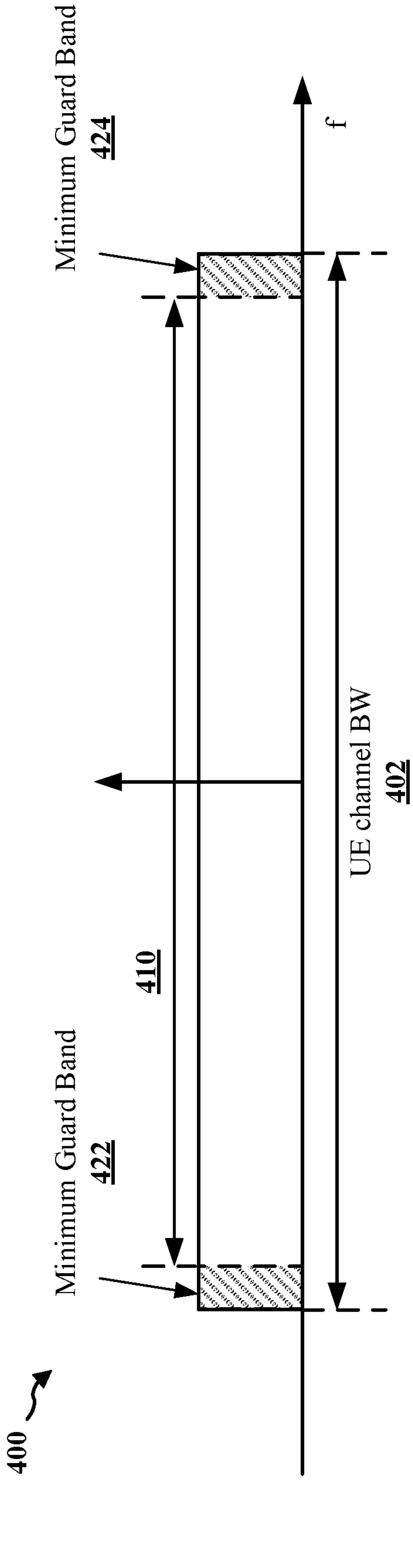
FIG. 4A is a diagram of channel bandwidth and minimum guard bands.

FIG. 4A is a diagram 400 of channel bandwidth 402 and guard bands 422 and 424. The UE channel bandwidth 410 may support a single NR RF carrier in the uplink or downlink at the UE. From a network node perspective, different UE channel bandwidths may be supported within the same spectrum for transmitting to and receiving from UEs connected to the network node. Transmission of multiple carriers to the same UE, e.g., carrier aggregation (CA), or multiple carriers to different UEs within the BS channel bandwidth can be supported. From the UE perspective, the UE may be configured with one or more BWP/carriers, each with its own UE channel bandwidth. The UE may not be aware of the network node channel bandwidth or how the network node may allocate bandwidth to different UEs. The placement of the UE channel bandwidth for each UE carrier may be flexible but can only be completely within the BS channel bandwidth.

Here, the guard band may be a frequency band not used for data transmission to reduce the interference between adjacent channels. The diagram shows that the channel bandwidth 402 may include a first guard band 422 and a second guard band 424. The first guard band 422 and the second guard band 424, For example, the first guard band 422 and the second guard band 424 may have a minimum guard band defined by a corresponding value from table E.

TABLE E

| SCS kHz | 5 MHz | 10 MHz | 15 MHz | 20 MHz | 25 MHz | 30 MHz | 40 MHz | 50 MHz | 60 MHz | 80 MHz | 90 MHz | 100 MHz |
|---|---|---|---|---|---|---|---|---|---|---|---|---|
| 15 | 242.5 | 312.5 | 382.5 | 452.5 | 522.5 | 592.5 | 552.5 | 692.5 | N/A | N/A | N/A | N/A |
| 30 | 505 | 665 | 645 | 805 | 785 | 945 | 905 | 1045 | 825 | 925 | 885 | 845 |
| 60 | N/A | 1010 | 990 | 1330 | 1310 | 1290 | 1610 | 1570 | 1530 | 1450 | 1410 | 1370 |

The number of RB s in the channel bandwidth 410 may be configured so that a particular minimum guard band. That is, the PRB s falling within UE channel bandwidth 410 not covering the minimum guard band, e.g., 422 and 424, may be used for communication.

Figure 4B:
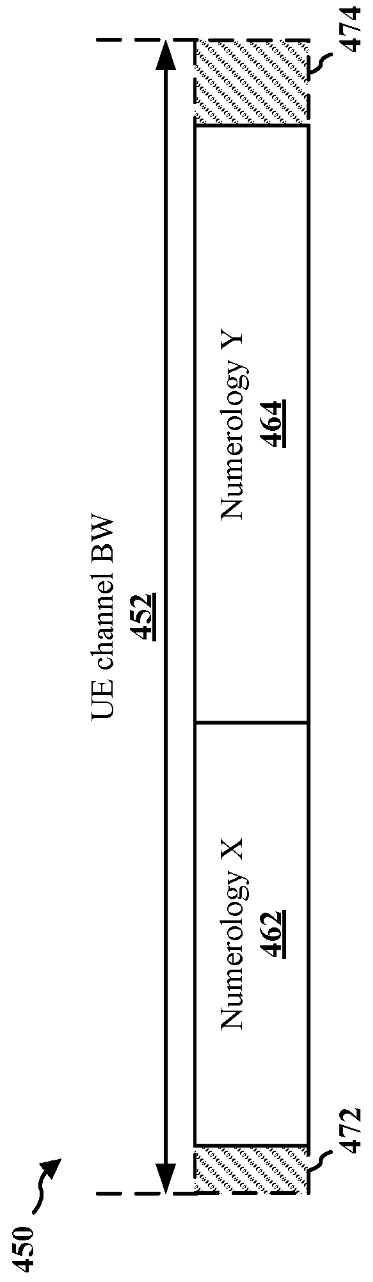
FIG. 4B is a diagram of channel bandwidth and minimum guard bands.

FIG. 4B is a diagram 450 of channel bandwidth 452 and minimum guard bands 472 and 474. In the case that multiple numerologies are multiplexed in the same symbol due to BS transmission of SSB, the minimum guard band on each side of the carrier may be the guard band applied at the configured channel bandwidth 452 for the numerology, e.g., based on a SCS, that is received immediately adjacent to the guard. For example, the channel bandwidth 452 may include a first part of channel bandwidth 462 with a numerology X and a second part of channel bandwidth 464 with a numerology Y. The first minimum guard band 472 immediately adjacent to the first part of a channel bandwidth 462 with the numerology X may be defined for numerology X when transmitted across a full UE channel bandwidth 452. The second minimum guard band 474 immediately adjacent to the second part of channel bandwidth 464 with the numerology Y may be defined for numerology Y when transmitted across full UE channel bandwidth 452.

The minimum channel bandwidth may depend on operating band and numerology. For example, for an n41 TDD band, three numerologies associated with SCS value of 15 kHz, 30 kHz, or 60 kHz may be supported, and for all three numerologies, the minimum channel bandwidth may be 10

MHz. For the n97 band, three SCS values of 15 kHz, 30 kHz, or 60 kHz may be used, and for 15 kHz, the minimum channel bandwidth may be 5 MHz and for 30 kHz or 60 kHz, the minimum channel bandwidth may be 10 MHz. For the n102 band, three SCS values of 15 kHz, 30 kHz, or 60 kHz may be used, and for 15 kHz, 30 kHz or 60 kHz, the minimum channel bandwidth may be 20 MHz.

For most of the NR operating bands, the step size of the corresponding GSCN may be configured as 1. Based on the small step size of GSCN, the flexibility of channelization for the network may be improved, but it may also increase the UEs' complexity of cell search. That is, based on the step size of GSCN being configured as 1, the UEs may perform the exhaustive search, which may increase the complexity in the implementation of the UE. Furthermore, due to the minimum guard band(s) and minimum channel bandwidth specification, a subset of the GSCN within the channel bandwidth may be adopted for channel detection SSB transmission.

A new (or modified) configuration of the range and step size of GSCN associated with the operating band(s) of primary cells for cell search (e.g., modified sync raster) may be provided herein. In one aspect, the new configuration may provide for the flexibility of channelization while also helping to reduce the complexity for cell searches at the UE. In some aspects, the UE may not exhaustively scan/sample the GSCN in the cell search, e.g., and may reduce the search as presented herein. The new configuration may include a sync raster design/scan to achieve a better tradeoff between NW flexibility and UE complexity reduction for cell search, which can be considered for the new frequency bands and reframed frequency bands, e.g., the NR or next-generation mobile communications.

For initial cell search/selection, the UE may scan the modified sync raster specified by one or multiple valid ranges, one or multiple starting points within the valid range, and one or multiple step sizes associated with the valid range and the starting point. That is, the UE may perform a full frequency scan on the modified one or more sync rasters for initial cell search/selection. At least a part of the valid range, the starting points, or the step size of the modified sync raster may be configured for the network node and the UEs. For example, the candidates for the modified sync rasters may be provided as Table F. For an operating band supported by the UE, the candidate SSB reference frequency location for sync raster scan is mapped to a row in the Table F.

In one aspect, after the initial cell search/selection, the UE may camp on a serving cell, and the serving cell may provide assistance information for cell re-selection including the sync raster configurations of neighbor cells. In another aspect, the UE may store the history/results of initial cell search and the assistance information provided by the network node for future cell selection/re-selection.

In some aspects, the network node and the UE may determine the valid range of the sync raster associated with an operating band. For example, the network node and the UE may determine the valid range of the sync raster associated with the operating band based on a channel raster range of a channel raster within the operating band, a duplex mode of the operating band, a bandwidth of an SSB, and a minimum guard band size.

In one aspect, the network node and the UE may consider the range of the channel raster within the operating band. The channel raster may have the lower bound and the upper bound (e.g., Table B), and the valid range of the sync raster associated with the operating band may be configured within the lower bound and the upper bound of the channel raster. Therefore, the lower bound and the upper bound of the channel raster may define the lower bound and the upper bound of the valid range of the sync raster. the network node and the UE may consider the range of the channel raster within the operating band to determine the valid range of the sync raster associated with an operating band.

In another aspect, the network node and the UE may consider the minimum guard band. Because the network node and the UE may use the PRBs falling within UE channel bandwidth not covering the minimum guard band (e.g., 410), the network node and the UE may consider the minimum guard band to determine the valid range of the sync raster associated with the operating band. In another aspect, the network node and the UE consider the bandwidth of the SSB.

For example, the operating band may have the range of 6425 to 6506 MHz with a range of channel raster of 828334 to 833666. The minimum guard band may be configured as 3 RB and SSB bandwidth of 20 RB at 30 kHz SCS. Then the valid range of sync raster may be configured as 9882:1:9929.

Figure 5:
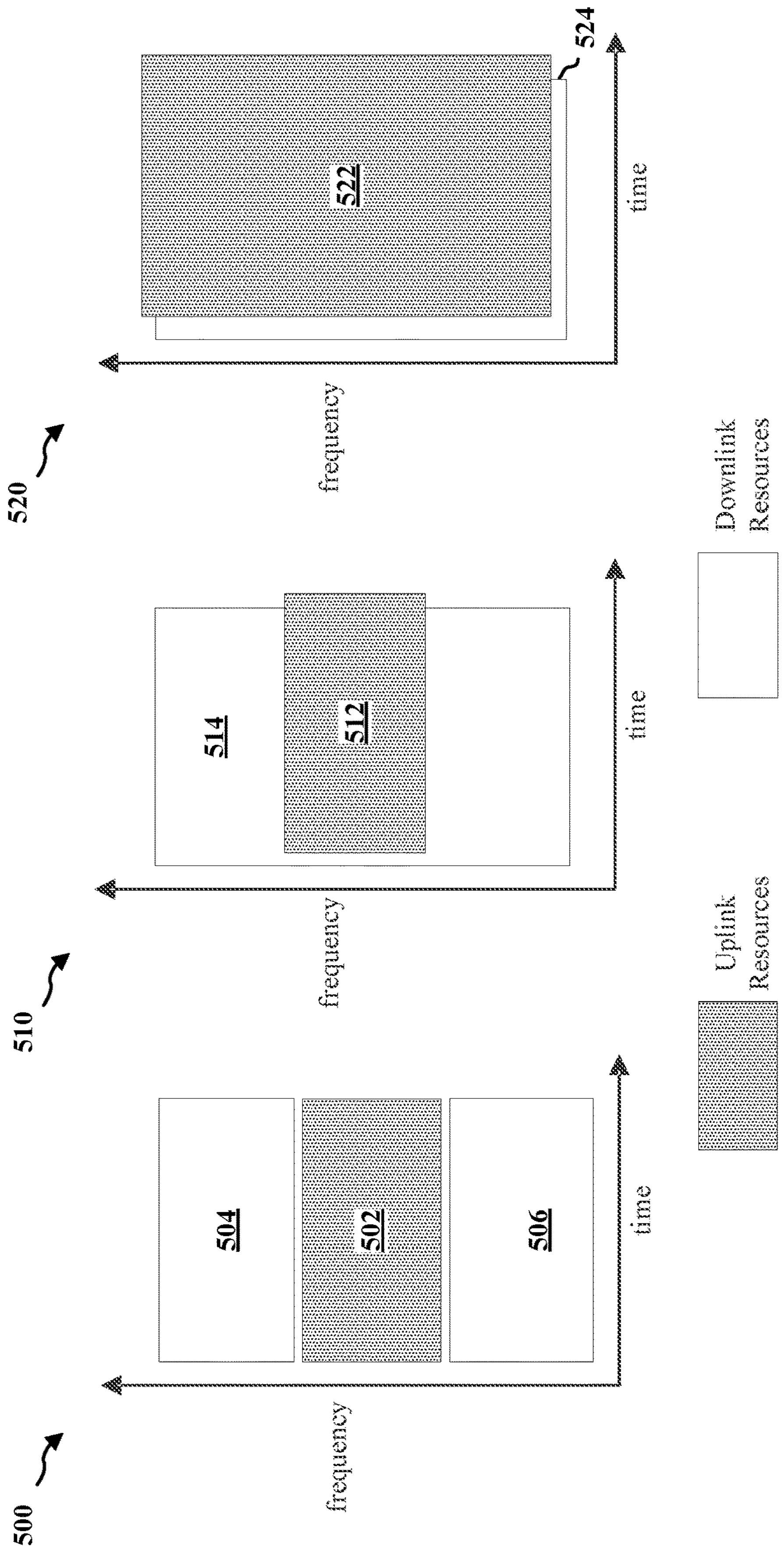
FIG. 5 illustrates full duplex resources.

In another aspect, the network node and the UE may consider the duplex mode of the operating band. For example, the duplex mode of the operating band may be a full duplex (FD) mode. FIG. 5 illustrates FD resources. FIG. 5 illustrates a first example 500 of sub-band FD (SBFD)

TABLE F

| Index of Operating Band | SCS of SSB | Transmission Pattern of SSB in Time Domain | Duplex Mode | Guard Band | Minimum CBW | Candidate SSB Reference Location on GSCN: Valid Range for Sync Raster Scan | Starting Points for Sync Raster Scan | Step Sizes for Sync Raster Scan |
|---|---|---|---|---|---|---|---|---|
| x | $SCS_{x,1}$ | $N_{x,1}$ beams mapped to $K_{x,1}$ consecutive slots | FDD | $GB_{x,1}$ | $CBW_{x,1}$ | $GSCN_{x,r10}$ to $GSCN_{x,r11}$ | $GSCN_{x,start1}$ | $STEP_{x,1}$ |
| | $SCS_{x,2}$ | $N_{x,2}$ beams mapped to $K_{x,2}$ consecutive slots | FDD | $GB_{x,2}$ | $CBW_{x,2}$ | $GSCN_{x,r20}$ to $GSCN_{x,r21}$ | $GSCN_{x,start2}$ | $STEP_{x,2}$ |
| y | $SCS_{y,1}$ | $N_{y,1}$ beams mapped to $K_{y,1}$ consecutive slots | TDD | $GB_{y,1}$ | $CBW_{y,1}$ | $GSCN_{y,r10}$ to $GSCN_{y,r11}$ | $GSCN_{y,start1}$ | $STEP_{y,1}$ |
| | $SCS_{y,2}$ | $N_{x,2}$ beams mapped to $K_{y,2}$ consecutive slots | SBFD | $GB_{y,2}$ | $CBW_{y,2}$ | $GSCN_{y,r20}$ to $GSCN_{y,r21}$ | $GSCN_{y,start2}$ | $STEP_{y,2}$ |

resources and a second example 510 and a third example 520 of in-band FD (IBFD) resources. The first example 500 illustrates the SBFD resources, where the uplink and the downlink resources may overlap in time using different frequencies. That is, the SBFD resources may include at least one uplink resources allocated in a first set of sub-bands and at least one downlink resources allocated in a second set of sub-bands overlapping in the time domain, while the first set of sub-bands and the second set of sub-bands not overlapping each other in the frequency domain. In the first example 500, the DL resources 504 and 506 may be separated from the UL resources 502 by guard bands. That is, the DL resources 504 and 506 may be configured discontinuously. Accordingly, the valid range of the sync raster may be configured discontinuously, and the step size of the sync raster may take multiple values. The second example 510 and the third example 520 illustrates the IBFD resources. The third example 520 may be referred to as single-frequency FD (SFFD). In the IBFD, signals may be transmitted and received in overlapping times and at least partially overlapping in frequency (overlapping in the time domain and the frequency domain). That is, UL resources 512 may overlap with DL resources 514, and UL resources 522 may overlap with DL resources 524. Accordingly, the DL resources 514 and the DL resources 524 may be continuously configured.

In some aspects, UE may configure a set of valid SSB reference frequency positions based on a step size of the sync rasters and an offset of the sync raster. The offset may refer to an offset of a starting point of the first $SSB_{REF}$ within the valid range of the synchronization raster, and the step size may refer to the step size between each $SSB_{REF}$. The step size of the sync rasters may be configured based on the channel raster range of the channel raster within the operating band, the duplex mode of the operating band, the bandwidth of the SSB, the minimum guard band size, and a granularity of the sync raster.

Figure 6:
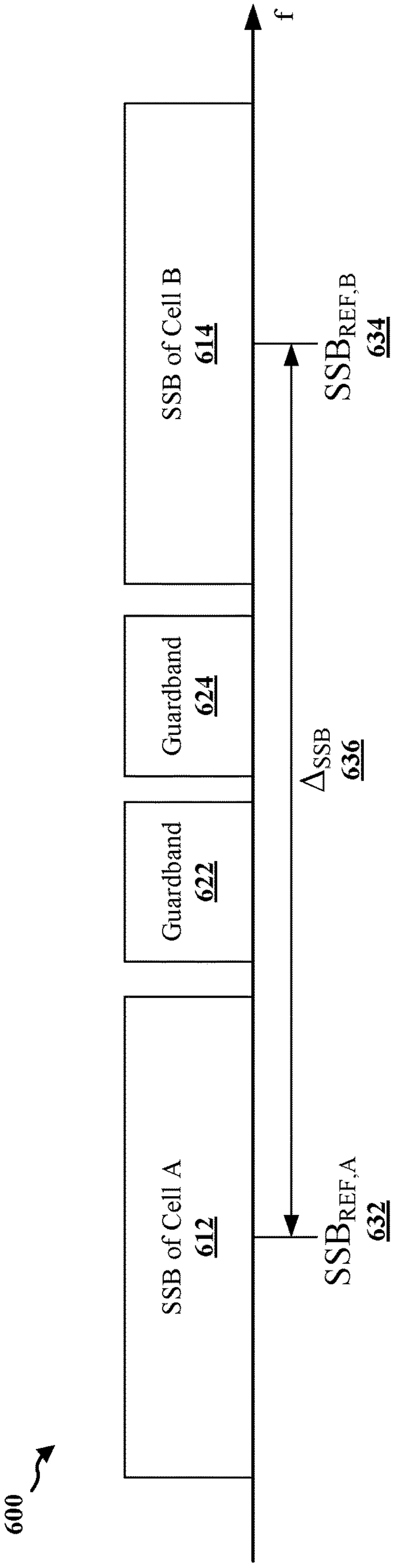
FIG. 6 is a diagram of a distance $\Delta_{SSB}$ between two SSBs.

FIG. 6 is a diagram 600 of a distance ASSB 636 between two SSBs. The two SSBs may include a first SSB of cell A 612 and a second SSB of cell B 614, with a first guard band 622 associated with the first SSB of cell A 612 and a second guard band 624 associated with the second SSB of cell B 614. Here, $SSB_{REF,A}$ 632 may be a reference frequency of the SSB of cell A 612, which is the center-frequency of the bandwidth of the SSB of the cell A 612. $SSB_{REF,B}$ 634 may be a reference frequency of the SSB of cell B 614, which is the center-frequency of the bandwidth of the SSB of the cell A 614. Because the $\Delta_{SSB}$ 636 between the first SSB of cell A 612 and the second SSB of cell B 614 may at least include two halves of the bandwidth of the SSB and two guard bands, the $\Delta_{SSB}$ 636 may be configured to meet the following condition of $\Delta_{SSB} \geq BW_{SSB} + 2{*}BW_{guard}$. Here, $BW_{SSB}$ may represent the bandwidth of the SSB, and $BW_{guard}$ may represent the bandwidth of the guard band.

Because the $\Delta_{SSB}$ 636 may be configured to be smaller than the minimum channel bandwidth, the $\Delta_{SSB}$ 636 may be configured to meet the condition of $CBW_{min} > \Delta_{SSB} \geq BW_{SSB} + 2{*}BW_{guard}$. Based on the $\Delta_{SSB}$ 636 determined, a step size of sync raster may be determined. That is, the step size of sync raster may be configured as $$\frac{\Delta_{SSB}}{\text{granularity of sync raster}}.$$

Accordingly, the network node and the UE may determine the candidate step size based on the minimum UE channel bandwidth, the minimum guard band, the bandwidth of the SSB, and the granularity of the sync raster.

Figure 7:
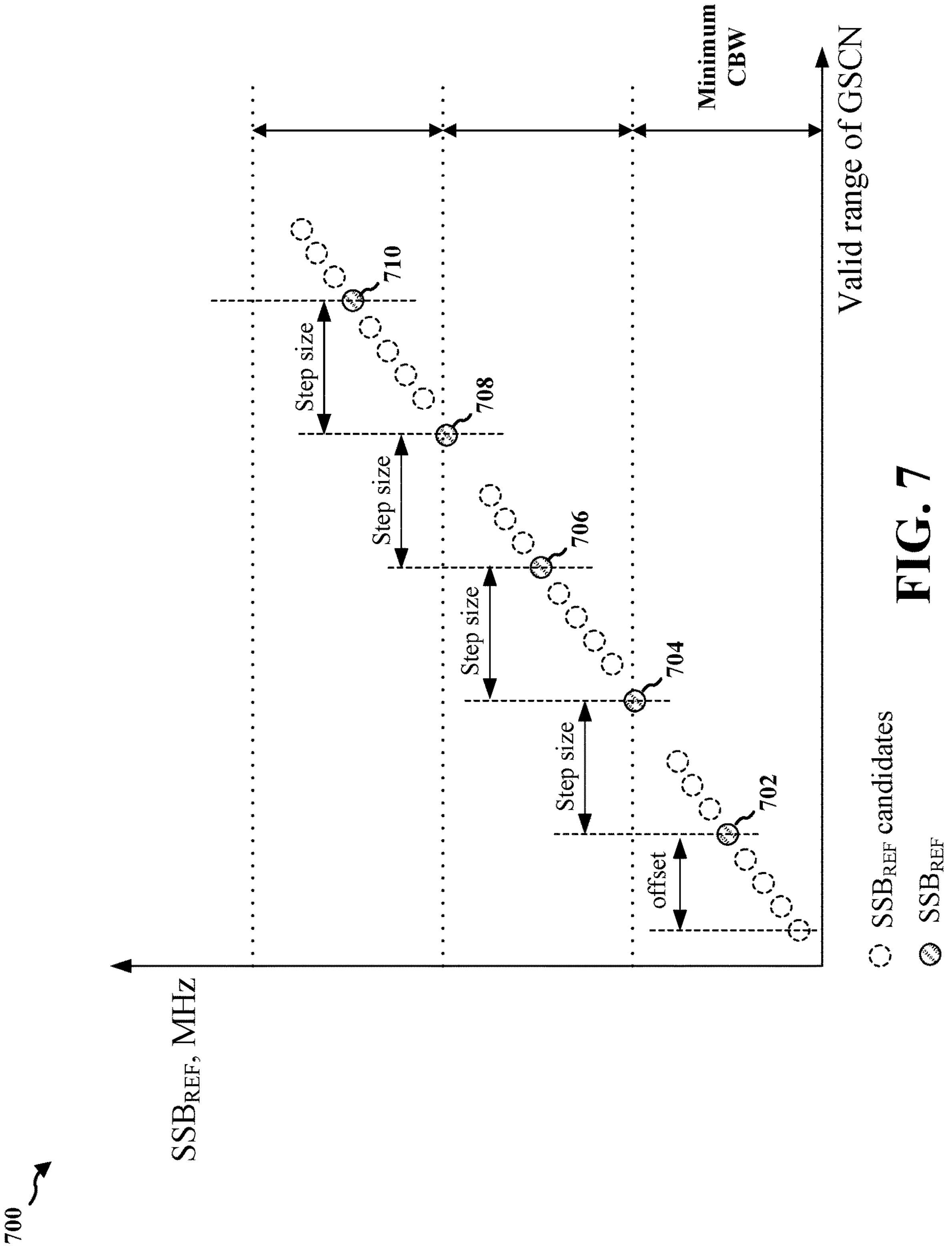
FIG. 7 illustrates a set of valid SSB reference frequency positions.

FIG. 7 illustrates a set of valid SSB reference frequency positions 700. Based on the step size of the sync raster, the network node and the UE may determine the valid SSB reference frequency positions to transmit the SSBs. FIG. 2B illustrates an example of an SSB. In one aspect, the network node and the UE may keep the candidates that enable each GSCN interval of minimum channel bandwidth has at least one valid $SSB_{REF}$. That is, the network node and the UE may first determine whether the candidate may provide at least one valid $SSB_{REF}$ for every minimum channel bandwidth.

In another aspect, the network node and the UE may shuffle, or adjust, the starting point of the $SSB_{REF}$ set to minimize the number of samples that are outside the GSCN interval of the minimum channel bandwidth. The samples that are outside the GSCN interval of the minimum channel bandwidth may not be used since they are not usable PRBs. In case of channel aggregation, where multiple channel bandwidth may be combined, the samples that may not fall within the GSCN interval of the minimum channel bandwidth may be used.

Based on the valid $SSB_{REF}$ set 700, the step size is 7 with an offset of 4. Here, the offset may refer to the offset of a starting point of the first $SSB_{REF}$ 702 within the valid range of the synchronization raster, and the step size may refer to the step size between each $SSB_{REF}$ (e.g., between the first $SSB_{REF}$ 702 and the second $SSB_{REF}$ 704). The dotted circles may represent the $SSB_{REF}$ candidates within the GSCN interval of the minimum channel bandwidth. The first $SSB_{REF}$ 702 may fall within the GSCN interval of the first minimum channel bandwidth. The second $SSB_{REF}$ 704 may not fall within the GSCN interval of the minimum channel bandwidth. The third $SSB_{REF}$ 706 may fall within the GSCN interval of the second minimum channel bandwidth. The fourth $SSB_{REF}$ 708 may not fall within the GSCN interval of the minimum channel bandwidth. The fifth $SSB_{REF}$ 710 may fall within the GSCN interval of the third minimum channel bandwidth. Her, the second $SSB_{REF}$ 704 and the fourth $SSB_{REF}$ 708 may be used in case of channel aggregation.

Figure 8:
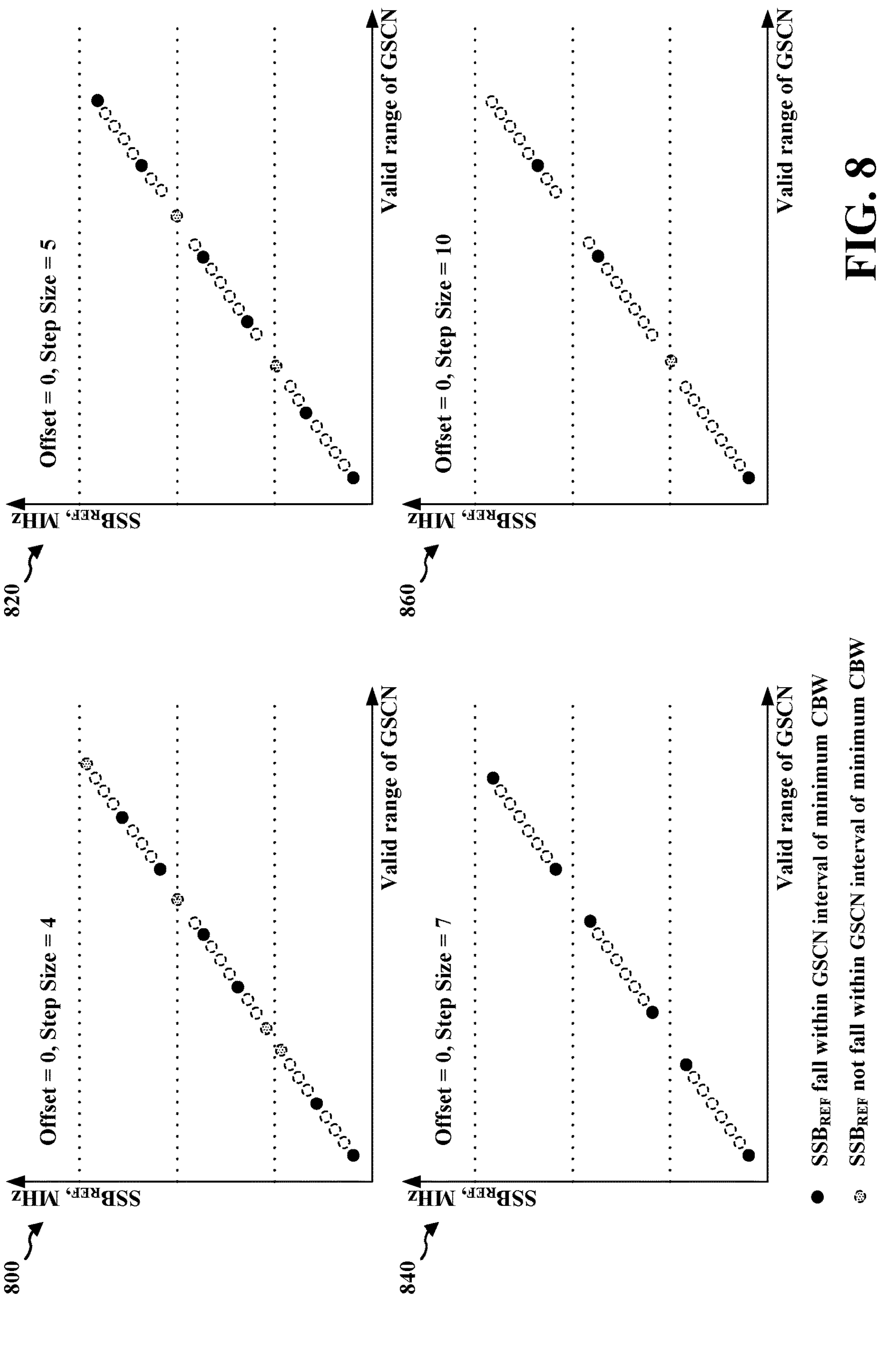
FIG. 8 illustrates four example sets of valid SSB reference frequency positions

FIG. 8 illustrates four example sets of valid SSB reference frequency positions 800, 820, 840, and 860. FIG. 2B illustrates an example of an SSB. Here, FIG. 8 shows the four different example sets of valid $SSB_{REF}$ sets based on different step size.

In one example, the first example $SSB_{REF}$ set 800 has an offset of 0 and a step size of 4. The first example $SSB_{REF}$ set 800 shows that total six (6) $SSB_{REF}$s may fall within the BSCN interval of minimal channel bandwidth, and four (4) $SSB_{REF}$s may not fall within the BSCN interval of minimal channel bandwidth.

In another example, the second example $SSB_{REF}$ set 820 has an offset of 0 and a step size of 5. The second example $SSB_{REF}$ set 820 shows that total six (6) $SSB_{REF}$s may fall within the BSCN interval of minimal channel bandwidth, and two (2) $SSB_{REF}$s may not fall within the BSCN interval of minimal channel bandwidth.

In another example, the third example $SSB_{REF}$ set 840 has an offset of 0 and a step size of 7. The third example $SSB_{REF}$ set 840 shows that total six (6) $SSB_{REF}$s may fall within the BSCN interval of minimal channel bandwidth with no $SSB_{REF}$s falling outside the BSCN interval of minimal channel bandwidth.

In another example, the fourth example $SSB_{REF}$ set 860 has an offset of 0 and a step size of 10. The fourth example $SSB_{REF}$ set 860 shows that total three (3) $SSB_{REF}$s may fall within the BSCN interval of minimal channel bandwidth, and one (1) $SSB_{REF}$s may not fall within the BSCN interval of minimal channel bandwidth.

Comparing the third example $SSB_{REF}$ set 840 and the $SSB_{REF}$ set 700 of FIG. 7, the third example $SSB_{REF}$ set 840 having the offset of 0 and the step size of 7 may have greater number of $SSB_{REF}$s falling within the BSCN interval of minimal channel bandwidth than the $SSB_{REF}$ set 700 of FIG. 7 having the offset of 4 and the step size of 7.

The configuration of defining the valid SSB reference frequency positions based on the step size of the sync rasters and the offset of the sync raster may be configured for the network node and the UEs. In one aspect, the network node may activate or deactivate the configuration of defining the valid SSB reference frequency positions based on the step size of the sync rasters and the offset of the sync raster for the UEs. That is, the network node may instruct the UEs to activate defining the valid SSB reference frequency positions based on the step size of the sync rasters and the offset of the sync raster and transmit the SSB using the valid SSB reference frequency positions defined based on the step size of the sync rasters and the offset of the sync raster. The UE may receive the instruction to activate defining the valid SSB reference frequency positions based on the step size of the sync rasters and the offset of the sync raster from the network node, and perform the system acquisition using the valid SSB reference frequency positions defined based on the step size of the sync rasters and the offset of the sync raster from the network node.

Figure 9:
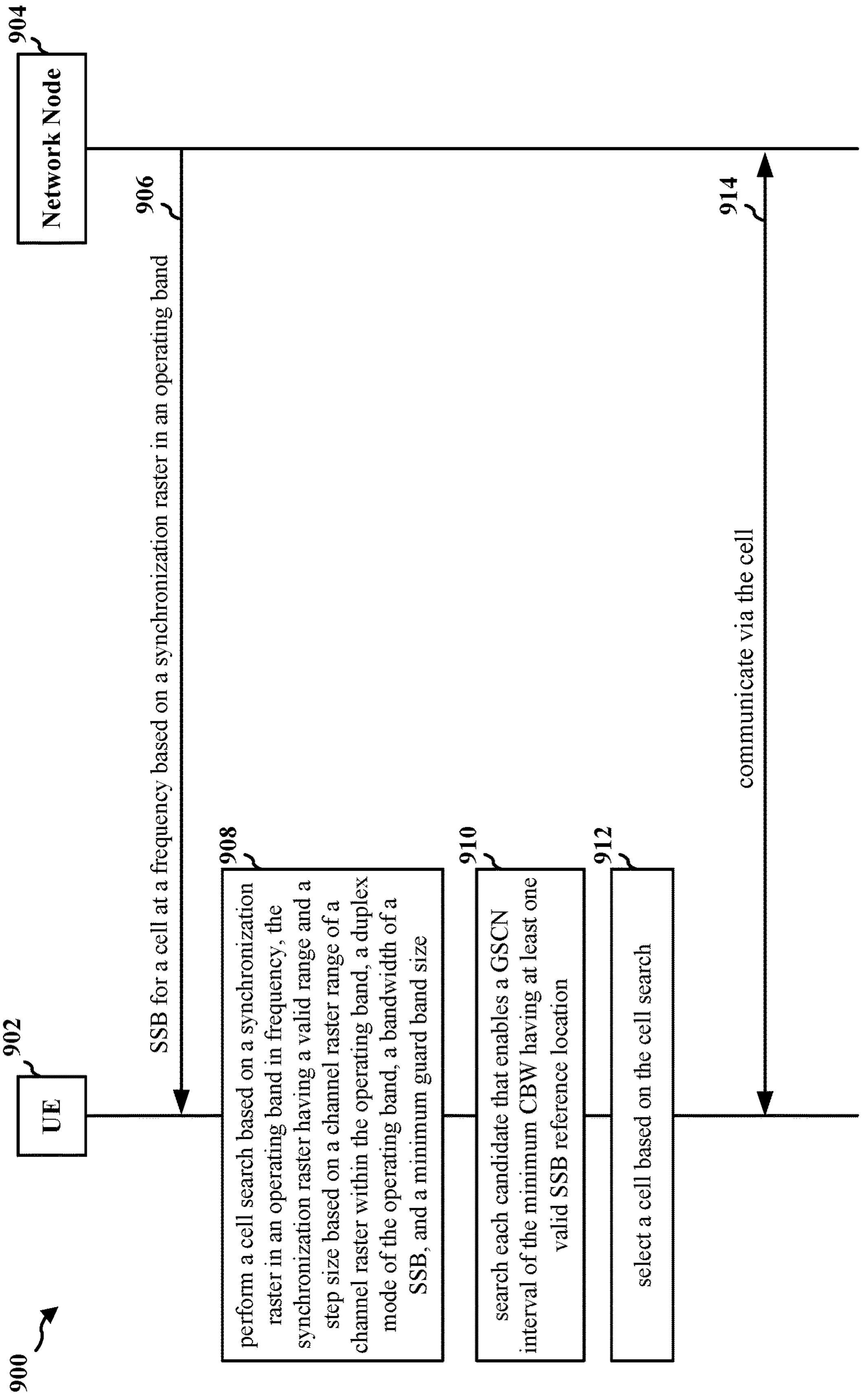
FIG. 9 is a call-flow diagram of a method of wireless communication.

FIG. 9 is a call-flow diagram 900 of a method of wireless communication. The call-flow diagram 900 may include a UE 902 and a network node 904. The network node 904 may correspond to a base station, e.g., in aggregation, or to one or more components of a disaggregated base station (e.g., CU 110, DU 130, or RU 140). In some aspects, the network node may be referred to as a network entity. A set of valid SSB reference frequency positions may be determined based on a step size of the sync rasters and an offset of the sync raster. The step size of the sync rasters may be configured based on the channel raster range of the channel raster within the operating band, the duplex mode of the operating band, the bandwidth of the SSB, the minimum guard band size, and a granularity of the sync raster.

At 906, the network node may transmit an SSB for a cell at a frequency based on a synchronization raster in an operating band, the synchronization raster having a valid range based on a channel raster range of a channel raster within the operating band, a duplex mode of the operating band, a bandwidth of the SSB, and a minimum guard band size.

In one aspect, the minimum guard band size may be based on the operating band, the duplex mode of the operating band, and a SCS of the SSB or a reference SCS associated with the operating band. In another aspect, the frequency of the SSB may be further based on a starting point within the valid range of the synchronization raster, a candidate step size, the candidate step size being based on a minimum CBW for the UE, the duplex mode of the operating band, the minimum guard band size, the bandwidth of the SSB, and a granularity of the synchronization raster. In one example, a $\Delta_{SSB}$ may be configured to meet a condition of $CBW_{min}>\Delta_{SSB}\geq BW_{SSB}+2*BW_{guard}$. Based on the $\Delta_{SSB}$ determined, a step size of sync raster may be determined as $$\frac{\Delta_{SSB}}{\text{granularity of sync raster}}.$$

In another example, the network node may keep the candidates that enable each GSCN interval of minimum channel bandwidth has at least one valid $SSB_{REF}$ for every minimum channel bandwidth. In another example, the network node may shuffle, or adjust, the starting point of the $SSB_{REF}$ set to minimize the number of samples that are outside the GSCN interval of the minimum channel bandwidth.

The UE may receive an SSB for the cell at the frequency based on a synchronization raster in an operating band.

At 908, the UE may perform a cell search based on a synchronization raster in an operating band in frequency, the synchronization raster having a valid range and a synchronization signal and physical broadcast channel (PBCH) block (SSB) search with a step size greater than one based on a channel raster range of a channel raster within the operating band, a duplex mode of the operating band, a bandwidth of an SSB, and a minimum guard band size. For example, at 1008, the step size may be seven. The operating band may have a range starting at 5425 MHz with the channel raster range starting at 828334, and the valid range of the synchronization raster may start at 9882, in some aspects. As an example, at 908, the UE may perform a cell search based on a synchronization raster in an operating band having a range starting at 5425 MHz, the synchronization raster having a valid range starting at 9882 and an SSB search with a step size of seven for a channel raster range starting at 828334.

In one aspect, the minimum guard band size may be based on the operating band, the duplex mode of the operating band, and a SCS of the SSB or a reference SCS associated with the operating band. In another aspect, the cell search may include a candidate step size determination based on a minimum channel bandwidth (CBW) for the UE, the minimum guard band size, the duplex mode of the operating band, the bandwidth of the SSB, and a granularity of the synchronization raster.

At 910, the UE may search each candidate that enables a GSCN interval of the minimum CBW having at least one valid SSB reference location, where an SSB reference location may be at a center frequency of a corresponding SSB that maps to a GSCN index within the valid range of the synchronization raster associated with the operating band of the UE. In one example, a $\Delta_{SSB}$ may be configured to meet a condition of $CBW_{min}>\Delta_{SSB}\geq BW_{SSB}+2*BW_{guard}$. Based on the $\Delta_{SSB}$ determined, a step size of sync raster may be determined as $$\frac{\Delta_{SSB}}{\text{granularity of sync raster}}.$$

In another example, the UE may keep the candidates that enable each GSCN interval of minimum channel bandwidth has at least one valid $SSB_{REF}$ for every minimum channel bandwidth. The UE may shuffle, or adjust the starting point of the $SSB_{REF}$ set to minimize the number of samples that are outside the GSCN interval of the minimum channel bandwidth. In one example, the UE may position the starting point for the SSB reference location to minimize a number of samples outside of the GSCN interval of the minimum CBW.

At 912, the UE may select a cell based on the cell search. The cell search may be based on the SSB received at 906.

At 914, the UE may communicate with the network node via the cell selected based on the cell search at 908. The network node may communicate with at least one UE via the cell associated with the SSB transmitted at 906.

Figure 10:
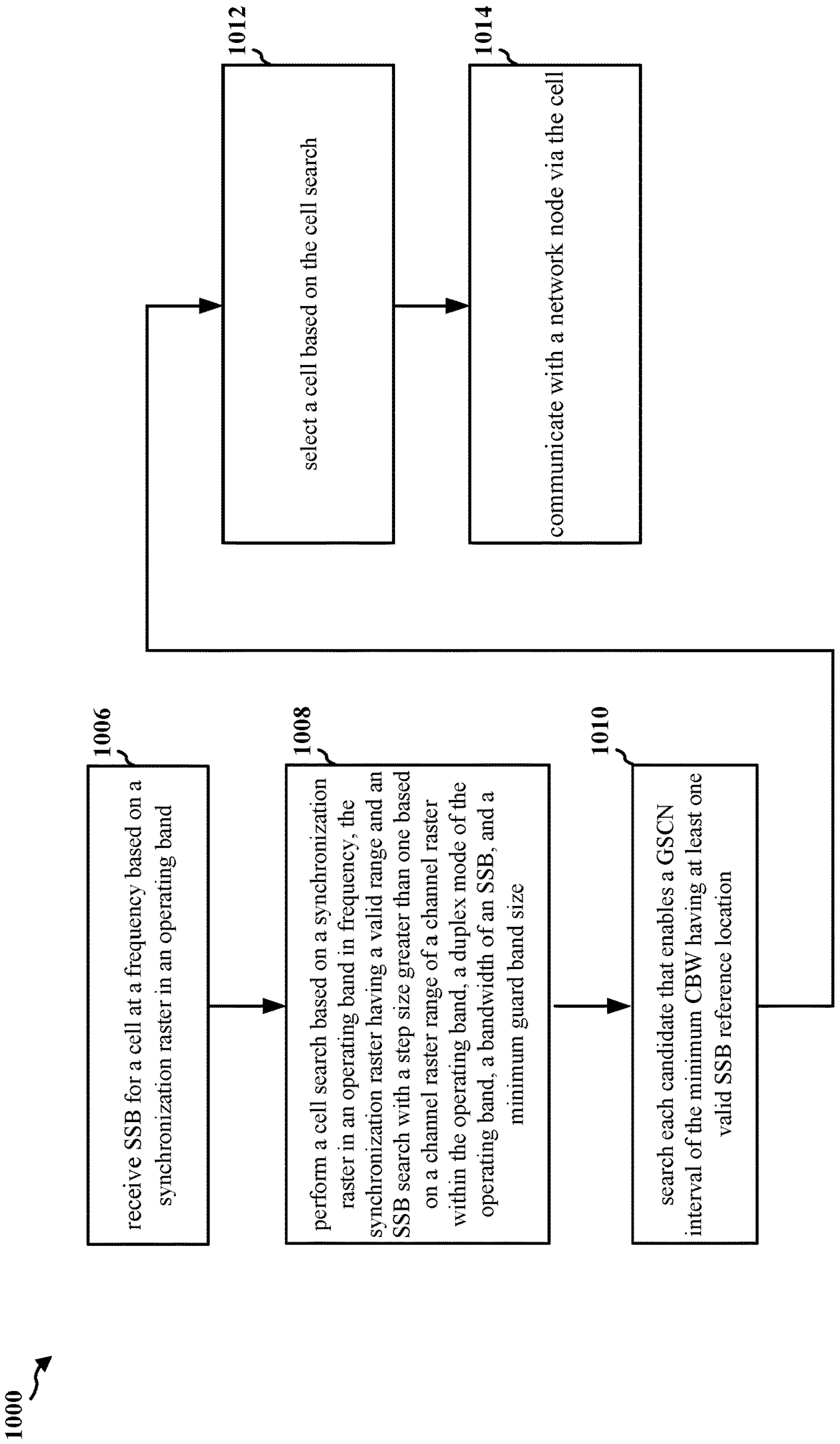
FIG. 10 is a flowchart of a method of wireless communication.

FIG. 10 is a flowchart 1000 of a method of wireless communication. The method may be performed by a UE (e.g., the UE 104; the apparatus 1304). The method improves cell search simplicity for a UE, while maintaining network deployment flexibility. A set of valid SSB reference frequency positions may be determined based on a step size of the sync rasters and an offset of the sync raster. The step size of the sync rasters may be configured based on the channel raster range of the channel raster within the operating band, the duplex mode of the operating band, the bandwidth of the SSB, the minimum guard band size, and a granularity of the sync raster.

At 1006, the UE may receive an SSB for the cell at the frequency based on a synchronization raster in an operating band. For example, at 906, the UE 902 may receive an SSB for the cell at the frequency based on a synchronization raster in an operating band. Furthermore, 1006 may be performed by an SSB reference frequency positions selecting component 198.

At 1008, the UE may perform a cell search based on a synchronization raster in an operating band in frequency, the synchronization raster having a valid range and a synchronization signal and physical broadcast channel (PBCH) block (SSB) search with a step size greater than one based on a channel raster range of a channel raster within the operating band, a duplex mode of the operating band, a bandwidth of an SSB, and a minimum guard band size. In one aspect, the minimum guard band size may be based on the operating band, the duplex mode of the operating band, and a SCS of the SSB or a reference SCS associated with the operating band. For example, at 1008, the step size may be seven. The operating band may have a range starting at 5425 MHz with the channel raster range starting at 828334, and the valid range of the synchronization raster may start at 9882, in some aspects. As an example, at 1108, the UE may perform a cell search based on a synchronization raster in an operating band having a range starting at 5425 MHz, the synchronization raster having a valid range starting at 9882 and an SSB search with a step size of seven for a channel raster range starting at 828334. In another aspect, the cell search may include a candidate step size determination based on a minimum CBW for the UE, the minimum guard band size, the duplex mode of the operating band, the bandwidth of the SSB, and a granularity of the synchronization raster. For example, at 908, the UE 902 may perform a cell search based on a synchronization raster in an operating band in frequency, the synchronization raster having a valid range and a step size based on a channel raster range of a channel raster within the operating band, a duplex mode of the operating band, a bandwidth of an SSB, and a minimum guard band size. Furthermore, 1008 may be performed by the SSB reference frequency positions selecting component 198.

At 1010, the UE may search each candidate that enables a GSCN interval of the minimum CBW having at least one valid SSB reference location. Here, an SSB reference location may be at a center frequency of a corresponding SSB that maps to a GSCN index within the valid range of the synchronization raster associated with the operating band of the UE. In one example, a $\Delta_{SSB}$ may be configured to meet a condition of $CBW_{min}>\Delta_{SSB}\geq BW_{SSB}+2*BW_{guard}$. Based on the $\Delta_{SSB}$ determined, a step size of sync raster may be determined as $$\frac{\Delta_{SSB}}{\text{granularity of sync raster}}.$$

In another example, the UE may keep the candidates that enable each GSCN interval of minimum channel bandwidth has at least one valid $SSB_{REF}$ for every minimum channel bandwidth. The UE may shuffle, or adjust the starting point of the $SSB_{REF}$ set to minimize the number of samples that are outside the GSCN interval of the minimum channel bandwidth. In one example, the UE may position the starting point for the SSB reference location to minimize a number of samples outside of the GSCN interval of the minimum CBW. For example, at 910, the UE 902 may search each candidate that enables a GSCN interval of the minimum CBW having at least one valid SSB reference location. Furthermore, 1010 may be performed by the SSB reference frequency positions selecting component 198.

At 1012, the UE may select a cell based on the cell search. The cell search may be based on the SSB received at 1006. For example, at 912, the UE 902 may select a cell based on the cell search. Furthermore, 1012 may be performed by the SSB reference frequency positions selecting component 198.

At 1014, the UE may communicate with the network node via the cell selected based on the cell search at 1008. For example, at 914, the UE 902 may communicate with the network node via the cell selected based on the cell search at 908. Furthermore, 1014 may be performed by the SSB reference frequency positions selecting component 198.

Figure 11:
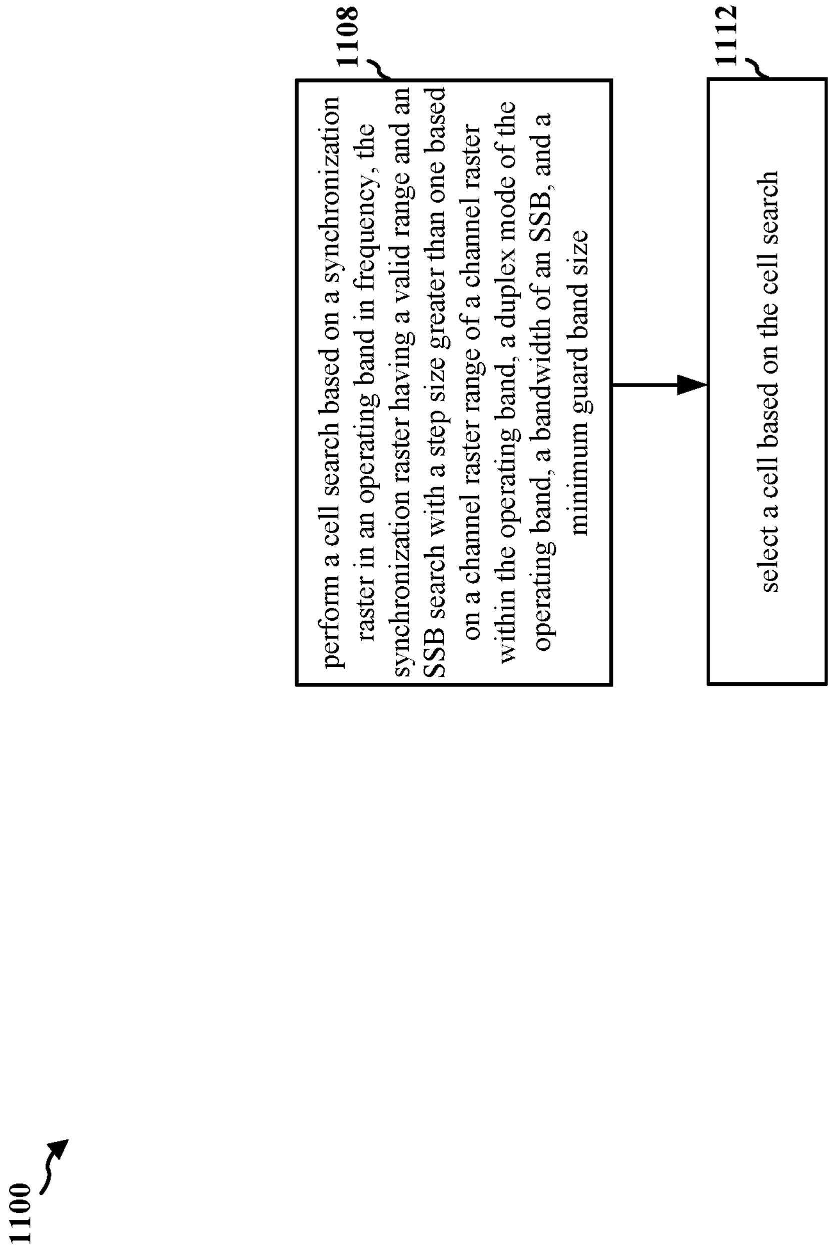
FIG. 11 is a flowchart of a method of wireless communication.

FIG. 11 is a flowchart 1100 of a method of wireless communication. The method may be performed by a UE (e.g., the UE 110/902; the apparatus 1304). The method improves cell search simplicity for a UE, while maintaining network deployment flexibility. A set of valid SSB reference frequency positions may be determined based on a step size of the sync rasters and an offset of the sync raster. The step size of the sync rasters may be configured based on the channel raster range of the channel raster within the operating band, the duplex mode of the operating band, the bandwidth of the SSB, the minimum guard band size, and a granularity of the sync raster.

At 1108, the UE may perform a cell search based on a synchronization raster in an operating band in frequency, the synchronization raster having a valid range and a step size based on a channel raster range of a channel raster within the operating band, a duplex mode of the operating band, a bandwidth of an SSB, and a minimum guard band size. For example, at 1108, the step size may be seven. The operating band may have a range starting at 5425 MHz with the channel raster range starting at 828334, and the valid range of the synchronization raster may start at 9882, in some aspects. As an example, at 1108, the UE may perform a cell search based on a synchronization raster in an operating band having a range starting at 5425 MHz, the synchronization raster having a valid range starting at 9882 and an SSB search with a step size of seven for a channel raster range starting at 828334. In one aspect, the minimum guard band size may be based on the operating band, the duplex mode of the operating band, and a SCS of the SSB or a reference SCS associated with the operating band. In another aspect, the cell search may include a candidate step size determination based on a minimum CBW for the UE, the minimum guard band size, the duplex mode of the operating band, the bandwidth of the SSB, and a granularity of the synchronization raster. For example, at 908, the UE 902 may perform a cell search based on a synchronization raster in an operating band in frequency, the synchronization raster having a valid range and a step size based on a channel raster range of a channel raster within the operating band, a duplex mode of the operating band, a bandwidth of an SSB, and a minimum guard band size. Furthermore, 1108 may be performed by the SSB reference frequency positions selecting component 198.

At 1112, the UE may select a cell based on the cell search. The cell search may be based on the SSB received at 1106. For example, at 912, the UE 902 may select a cell based on the cell search. Furthermore, 1112 may be performed by the SSB reference frequency positions selecting component 198.

Figure 12:
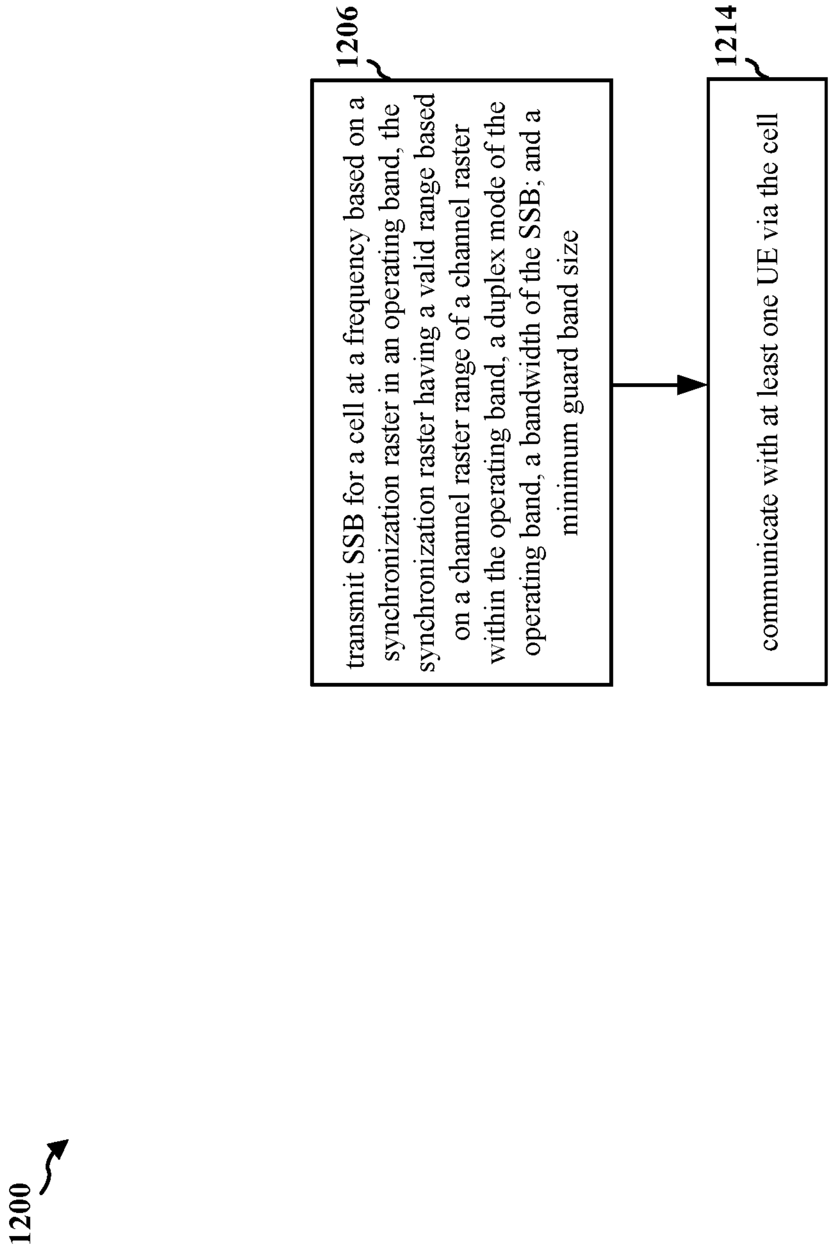
FIG. 12 is a flowchart of a method of wireless communication.

FIG. 12 is a flowchart 1200 of a method of wireless communication. The method may be performed by a network node (e.g., the base station 102/904; the network entity 1502/1660). The network node may correspond to a base station, e.g., in aggregation, or to one or more components of a disaggregated base station (e.g., CU 110, DU 130, or RU 140). In some aspects, the network node may be referred to as a network entity. The method improves cell search simplicity for a UE, while maintaining network deployment flexibility. A set of valid SSB reference frequency positions may be determined based on a step size of the sync rasters and an offset of the sync raster. The step size of the sync rasters may be configured based on the channel raster range of the channel raster within the operating band, the duplex mode of the operating band, the bandwidth of the SSB, the minimum guard band size, and a granularity of the sync raster.

At 1206, the network node may provide (e.g., transmit) an SSB for a cell at a frequency based on a synchronization raster in an operating band, the synchronization raster having a valid range based on a channel raster range of a channel raster within the operating band, a duplex mode of the operating band, a bandwidth of the SSB, and a minimum guard band size. In one aspect, the minimum guard band size may be based on the operating band, the duplex mode of the operating band, and a SCS of the SSB or a reference SCS associated with the operating band. In another aspect, the frequency of the SSB may be further based on a starting point within the valid range of the synchronization raster, a candidate step size, the candidate step size being based on a minimum CBW for the UE, the duplex mode of the operating band, the minimum guard band size, the bandwidth of the SSB, and a granularity of the synchronization raster. For example, the candidate step size may be seven. The operating band may have a range starting at 5425 MHz with the channel raster range starting at 828334, and the valid range of the synchronization raster may start at 9882, in some aspects. In one example, a $\Delta_{SSB}$ may be configured to meet a condition of $CBW_{min}>\Delta_{SSB}\geq BW_{SSB}+2*BW_{guard}$. Based on the $\Delta_{SSB}$ determined, a step size of sync raster may be determined as $$\frac{\Delta_{SSB}}{\text{granularity of sync raster}}.$$

In another example, the network node may keep the candidates that enable each GSCN interval of minimum channel bandwidth has at least one valid $SSB_{REF}$ for every minimum channel bandwidth. In another example, the network node may shuffle, or adjust, the starting point of the $SSB_{REF}$ set to minimize the number of samples that are outside the GSCN interval of the minimum channel bandwidth. For example, at 906, the network node 904 may transmit an SSB for a cell at a frequency based on a synchronization raster in an operating band, the synchronization raster having a valid range based on a channel raster range of a channel raster within the operating band, a duplex mode of the operating band, a bandwidth of the SSB, and a minimum guard band size. Furthermore, 1206 may be performed by an SSB reference frequency positions configuring component 199.

At 1214, the network node may communicate with at least one UE via the cell associated with the SSB transmitted at 1206. For example, at 914, the network node 904 may communicate with at least one UE via the cell associated with the SSB transmitted at 906. Furthermore, 1214 may be performed by the SSB reference frequency positions configuring component 199.

Figure 13:
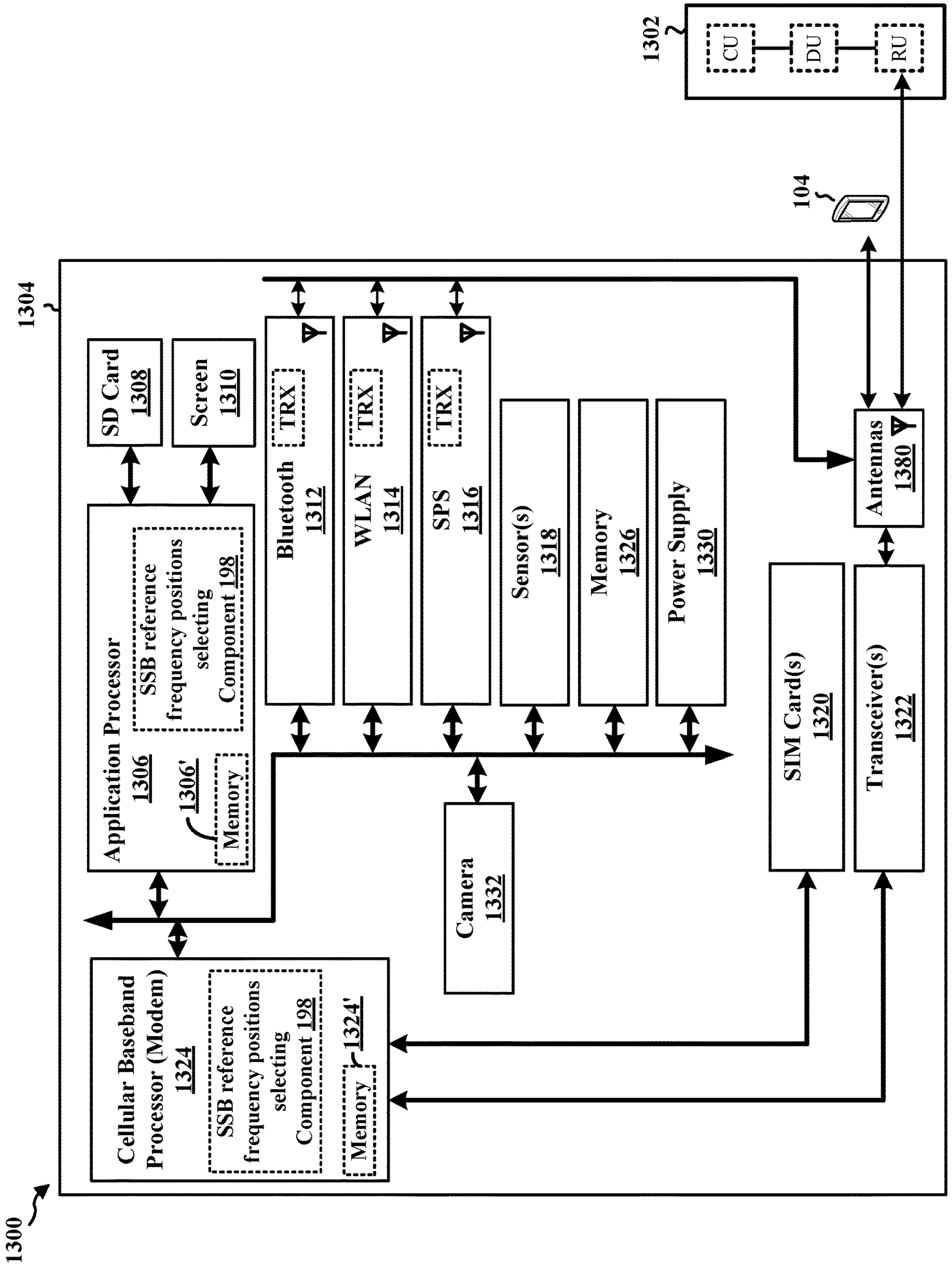
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed supra, the SSB reference frequency positions selecting component 198 is configured to perform a cell search based on a synchronization raster in an operating band in frequency, the synchronization raster having a valid range and a step size based on a channel raster range of a channel raster within the operating band, a duplex mode of the operating band, a bandwidth of an SSB, and a minimum guard band size, and select a cell based on the cell search. The SSB reference frequency positions selecting component 198 may be further configured to perform any of the aspects described in connection with the flowchart in FIG. 10 or 11, and/or the aspects performed by the UE in FIG. 9. The SSB reference frequency positions selecting component 198 may be within the cellular baseband processor 1324, the application processor 1306, or both the cellular baseband processor 1324 and the application processor 1306. The SSB reference frequency positions selecting component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, includes means for performing a cell search based on a synchronization raster in an operating band in frequency, the synchronization raster having a valid range and a step size based on a channel raster range of a channel raster within the operating band, a duplex mode of the operating band, a bandwidth of an SSB, and a minimum guard band size, and means for selecting a cell based on the cell search. In one configuration, the minimum guard band size is based on the operating band, the duplex mode of the operating band, and an SCS of the SSB or a reference SCS associated with the operating band. In one configuration, the cell search includes a candidate step size determination based on a minimum CBW for the UE, the minimum guard band size, the duplex mode of the operating band, the bandwidth of the SSB, and a granularity of the synchronization raster. In one configuration, the apparatus 1304, and in particular the cellular baseband processor 1324 and/or the application processor 1306, further including means for searching each candidate that enables a GSCN interval of the minimum CBW having at least one valid SSB reference location, where an SSB reference location is at a center frequency of a corresponding SSB that maps to a GSCN index within the valid range of the synchronization raster associated with the operating band of the UE. In one configuration, a starting point for the SSB reference location is positioned to minimize a number of samples outside of the GSCN interval of the minimum CBW. In one configuration, the apparatus 1304, and in particular the cellular baseband processor 1324 and/or the application processor 1306, further including means for receiving an SSB for the cell at the frequency based on a synchronization raster in an operating band, where the cell search is based on the received SSB. In one configuration, the apparatus 1304, and in particular the cellular baseband processor 1324 and/or the application processor 1306, further including means for communicating with a network node via the cell selected based on the cell search. The apparatus may further include means for performing any of the aspects described in connection with the flowchart in FIG. 10 or 11, and/or the aspects performed by the UE in FIG. 9. The means may be the SSB reference frequency positions selecting component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
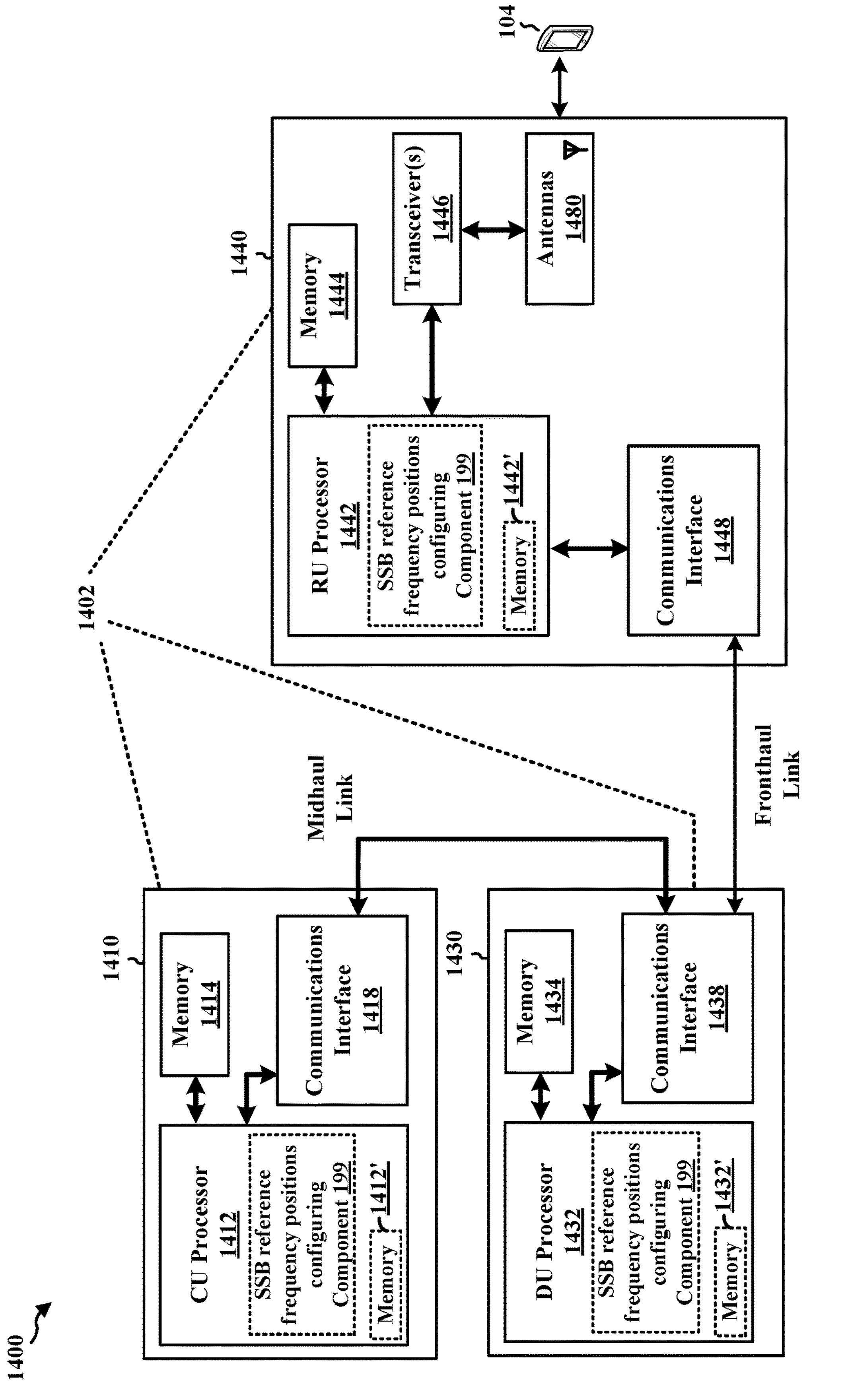
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality, and may be referred to as a network node, in some aspects. The network entity 1402 may include at least one of a CU 1410, a DU 1430, or an RU 1440. For example, depending on the layer functionality handled by the SSB reference frequency positions configuring component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the SSB reference frequency positions configuring component 199 is configured to transmit an SSB for a cell at a frequency based on a synchronization raster in an operating band, the synchronization raster having a valid range based on a channel raster range of a channel raster within the operating band, a duplex mode of the operating band, a bandwidth of the SSB, and a minimum guard band size, and communicate with at least one UE via the cell. The SSB reference frequency positions configuring component 199 may be further configured to perform any of the aspects described in connection with the flowchart in FIG. 12, and/or the aspects performed by the network node in FIG. 9. The SSB reference frequency positions configuring component 199 may be within one or more processors of one or more of the CU 1410, DU 1430, and the RU 1440. The SSB reference frequency positions configuring component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for transmitting an SSB for a cell at a frequency based on a synchronization raster in an operating band, the synchronization raster having a valid range based on a channel raster range of a channel raster within the operating band, a duplex mode of the operating band, a bandwidth of the SSB, and a minimum guard band size, and communicating with at least one UE via the cell. In one configuration, the minimum guard band size is based on the operating band, the duplex mode of the operating band and an SCS of the SSB or a reference SCS associated with the operating band. In one configuration, the frequency of the SSB is further based on a starting point within the valid range of the synchronization raster, a candidate step size, the candidate step size being based on a minimum CBW for the UE, the duplex mode of the operating band, the minimum guard band size, the bandwidth of the SSB, and a granularity of the synchronization raster. The network entity may further include means for performing any of the aspects described in connection with the flowchart in FIG. 12, and/or the aspects performed by the network node in FIG. 9. The means may be the SSB reference frequency positions configuring component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Figure 15:
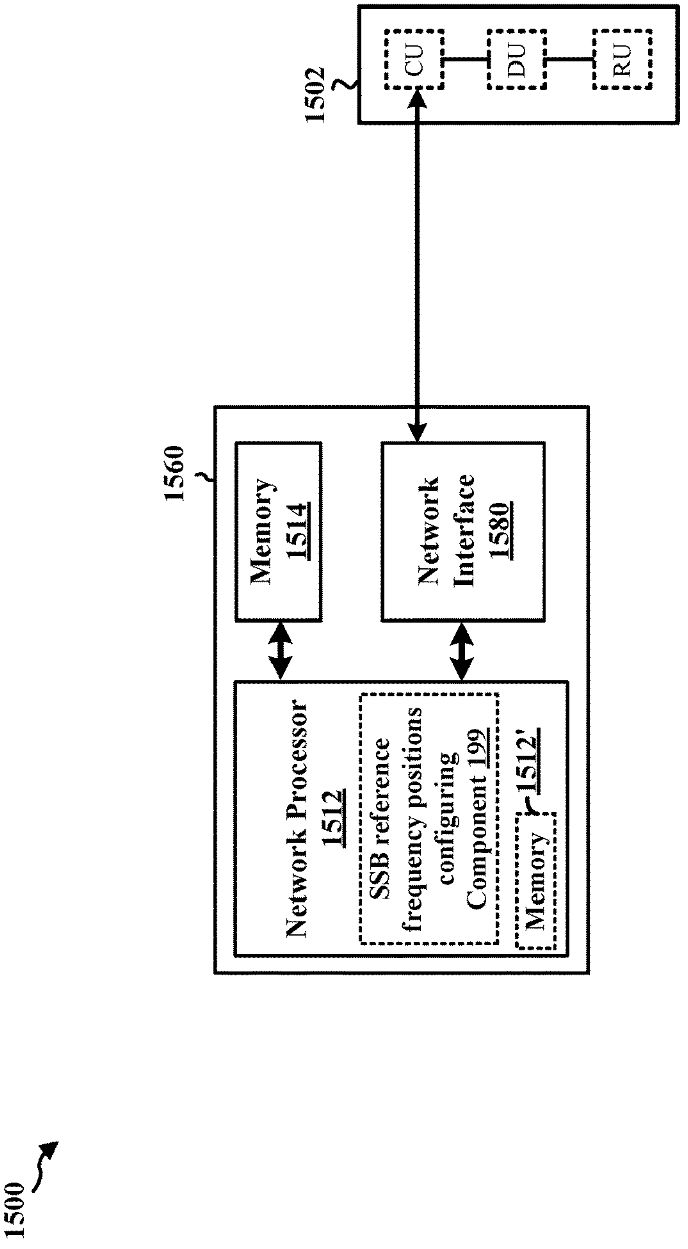
FIG. 15 is a diagram illustrating an example of a hardware implementation for an example network entity.

FIG. 15 is a diagram 1500 illustrating an example of a hardware implementation for a network entity 1560. In one example, the network entity 1560 may be within the core network 120. The network entity 1560 may include a network processor 1512. The network processor 1512 may include on-chip memory 1512'. In some aspects, the network entity 1560 may further include additional memory modules 1514. The network entity 1560 communicates via the network interface 1580 directly (e.g., backhaul link) or indirectly (e.g., through a RIC) with the CU 1502. The on-chip memory 1512' and the additional memory modules 1514 may each be considered a computer-readable medium/memory. Each computer-readable medium/memory may be non-transitory. The processor 1512 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the SSB reference frequency positions configuring component 199 is configured to transmit an SSB for a cell at a frequency based on a synchronization raster in an operating band, the synchronization raster having a valid range based on a channel raster range of a channel raster within the operating band, a duplex mode of the operating band, a bandwidth of the SSB, and a minimum guard band size, and communicate with at least one UE via the cell. The SSB reference frequency positions configuring component 199 may be within the processor 1512. The SSB reference frequency positions configuring component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1560 may include a variety of components configured for various functions. In one configuration, the network entity 1560 includes means for transmitting an SSB for a cell at a frequency based on a synchronization raster in an operating band, the synchronization raster having a valid range based on a channel raster range of a channel raster within the operating band, a duplex mode of the operating band, a bandwidth of the SSB, and a minimum guard band size, and communicating with at least one UE via the cell. In one configuration, the minimum guard band size is based on the operating band, the duplex mode of the operating band and an SCS of the SSB or a reference SCS associated with the operating band. In one configuration, the frequency of the SSB is further based on a starting point within the valid range of the synchronization raster, a candidate step size, the candidate step size being based on a minimum CBW for the UE, the duplex mode of the operating band, the minimum guard band size, the bandwidth of the SSB, and a granularity of the synchronization raster. The means may be the SSB reference frequency positions configuring component 199 of the network entity 1560 configured to perform the functions recited by the means.

In some aspects of the current disclosure, a UE may be configured to perform a cell search based on a synchronization raster in an operating band in frequency, the synchronization raster having a valid range and a step size based on a channel raster range of a channel raster within the operating band, a duplex mode of the operating band, a bandwidth of an SSB, and a minimum guard band size, and select a cell based on the cell search. A network node may be configured to transmit an SSB for a cell at a frequency based on a synchronization raster in an operating band, the synchronization raster having a valid range based on a channel raster range of a channel raster within the operating band, a duplex mode of the operating band, a bandwidth of the SSB, and a minimum guard band size, and communicate with at least one UE via the cell.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including performing a cell search based on a synchronization raster in an operating band in frequency, the synchronization raster having a valid range and a synchronization signal and physical broadcast channel (PBCH) block (SSB) search with a step size greater than one based on a channel raster range of a channel raster within the operating band, a duplex mode of the operating band, a bandwidth of an SSB, and a minimum guard band size, and selecting a cell based on the cell search.

Aspect 2 is the method of aspect 1, where the minimum guard band size is based on the operating band, the duplex mode of the operating band, and an SCS of the SSB or a reference SCS associated with the operating band.

Aspect 3 is the method of any of aspects 1 and 2, where the cell search includes a candidate step size determination based on a minimum CBW for the UE, the minimum guard band size, the duplex mode of the operating band , the bandwidth of the SSB, and a granularity of the synchronization raster.

Aspect 4 is the method of aspect 3, further including searching each candidate that enables a GSCN interval of the minimum CBW having at least one valid SSB reference location, where an SSB reference location is at a center frequency of a corresponding SSB that maps to a GSCN index within the valid range of the synchronization raster associated with the operating band of the UE.

Aspect 5 is the method of aspect 4, where a starting point for the SSB reference location is positioned to minimize a number of samples outside of the GSCN interval of the minimum CBW.

Aspect 6 is the method of any of aspects 1 to 5, further including receiving an SSB for the cell at the frequency based on a synchronization raster in an operating band, where the cell search is based on the received SSB.

Aspect 7 is the method of any of aspects 1 to 6, further including communicating with a network node via the cell selected based on the cell search.

Aspect 8 is the method of any of aspects 1 to 7, wherein the step size is seven.

Aspect 9 is the method of any of aspects 1 to 8, wherein the operating band has a range starting at 5425 MHz with the channel raster range starting at 828334, and the valid range of the synchronization raster starts at 9882.

Aspect 10 is an apparatus for wireless communication including at least one processor coupled to a memory and configured, based at least in part on information stored in the memory, to implement any of aspects 1 to 9.

In aspect 11, the apparatus of aspect 10 further includes a transceiver coupled to the at least one processor.

Aspect 12 is an apparatus for wireless communication including means for implementing any of aspects 1 to 9.

Aspect 13 is a non-transitory computer-readable medium storing computer executable code, where the code when executed by a processor causes the processor to implement any of aspects 1 to 9.

Aspect 14 is a method of wireless communication at a network node, including transmitting an SSB for a cell at a frequency based on a synchronization raster in an operating band, the synchronization raster having a valid range based on a channel raster range of a channel raster within the operating band, a duplex mode of the operating band, a bandwidth of the SSB, and a minimum guard band size, and communicating with at least one UE via the cell.

Aspect 15 is the method of aspect 14, where the minimum guard band size is based on the operating band, the duplex mode of the operating band and an SCS of the SSB or a reference SCS associated with the operating band.

Aspect 16 is the method of any of aspects 14 and 15, where the frequency of the SSB is further based on a starting point within the valid range of the synchronization raster, a candidate step size, the candidate step size being based on a minimum CBW for the UE, the duplex mode of the operating band, the minimum guard band size, the bandwidth of the SSB, and a granularity of the synchronization raster.

Aspect 17 is the method of any of aspect 16 further including that the candidate step size is seven.

Aspect 18 is the method of any of aspect 16 or 17, wherein the operating band has a range starting at 5425 MHz with the channel raster range starting at 828334, and the valid range of the synchronization raster starts at 9882.

Aspect 19 is an apparatus for wireless communication including at least one processor coupled to a memory and configured, based at least in part on information stored in the memory, to implement any of aspects 13 to 17.

In aspect 20, the apparatus of aspect 19 further includes a transceiver coupled to the at least one processor.

Aspect 21 is an apparatus for wireless communication including means for implementing any of aspects 14 to 18.

Aspect 22 is a non-transitory computer-readable medium storing computer executable code, where the code when executed by a processor causes the processor to implement any of aspects 13 to 17.

Aspect 23 is a method of wireless communication at a UE, comprising performing a cell search based on a synchronization raster in an operating band having a range starting at 5425 MHz, the synchronization raster having a valid range starting at 9882 and a synchronization signal and physical broadcast channel (PBCH) block (SSB) search with a step size of seven for a channel raster range starting at 828334; and selecting a cell based on the cell search.

Aspect 24 is the method of aspect 23, where a minimum guard band size is based on the operating band, a duplex mode of the operating band, and an SCS of the SSB or a reference SCS associated with the operating band.

Aspect 25 is the method of any of aspects 23 and 24, where the cell search includes a candidate step size determination based on a minimum CBW for the UE, the minimum guard band size, the duplex mode of the operating band or the common control resource set (CORESET) associated with cell search, the bandwidth of the SSB, and a granularity of the synchronization raster.

Aspect 26 is the method of aspect 25, further including searching each candidate that enables a GSCN interval of the minimum CBW having at least one valid SSB reference location, where an SSB reference location is at a center frequency of a corresponding SSB that maps to a GSCN index within the valid range of the synchronization raster associated with the operating band of the UE.

Aspect 27 is the method of aspect 26, where a starting point for the SSB reference location is positioned to minimize a number of samples outside of the GSCN interval of the minimum CBW.

Aspect 28 is the method of any of aspects 23 to 27, further including receiving an SSB for the cell at the frequency based on a synchronization raster in an operating band, where the cell search is based on the received SSB.

Aspect 29 is the method of any of aspects 23 to 28, further including communicating with a network node via the cell selected based on the cell search.

Aspect 30 is an apparatus for wireless communication including at least one processor coupled to a memory and configured, based at least in part on information stored in the memory, to implement any of aspects 23 to 29.

In aspect 31, the apparatus of aspect 30 further includes a transceiver coupled to the at least one processor.

Aspect 32 is an apparatus for wireless communication including means for implementing any of aspects 23 to 29.

Aspect 33 is a non-transitory computer-readable medium storing computer executable code, where the code when executed by a processor causes the processor to implement any of aspects 23 to 29.

What is claimed is:

1. A method of wireless communication at a user equipment (UE), comprising:

performing a cell search in an operating band in frequency based on a global synchronization channel number (GSCN) range of a synchronization raster that starts at 9882 and based on a synchronization signal and physical broadcast channel (PBCH) block (SSB) search with a step size of seven in a frequency domain; and selecting a cell based on the cell search.

2. The method of claim 1, wherein the GSCN range for the synchronization raster is based on a channel raster range of a channel raster within the operating band, a duplex mode of the operating band, a bandwidth of an SSB, and a minimum guard band size.

3. The method of claim 2, wherein the channel raster range for the operating band starts at 828334.

4. The method of claim 2, wherein the minimum guard band size is based on the operating band, the duplex mode of the operating band, and a subcarrier spacing (SCS) of the SSB or a reference SCS associated with the operating band.

5. The method of claim 2, wherein the cell search includes a candidate step size determination based on a minimum channel bandwidth (CBW) for the UE, the minimum guard band size, the duplex mode of the operating band, the bandwidth of the SSB, and a granularity of the synchronization raster.

6. The method of claim 5, further comprising:

searching each candidate that enables a (GSCN) interval of the minimum CBW having at least one SSB reference location, wherein the SSB reference location is at a center frequency of a corresponding SSB that maps to a GSCN index within the GSCN range of the synchronization raster associated with the operating band of the UE.

7. The method of claim 6, wherein a starting point for the SSB reference location is positioned to minimize a number of samples outside of the GSCN interval of the minimum CBW.

8. The method of claim 1, wherein the operating band has a range starting at 6425 MHz, and the method further comprises receiving the SSB for the cell at the frequency based on the synchronization raster in the operating band, wherein the cell search is based on the SSB.

9. The method of claim 1, further comprising:

communicating with a network node via the cell selected based on the cell search.

10. An apparatus for wireless communication at a user equipment (UE), comprising:

memory; and at least one processor coupled to the memory and configured to:

perform a cell search in an operating band in frequency based on a global synchronization channel number (GSCN) range of a synchronization raster that starts at 9882 and based on a synchronization signal and physical broadcast channel (PBCH) block (SSB) search with a step size of seven in a frequency domain; and select a cell based on the cell search.

11. The apparatus of claim 10, wherein the GSCN range for the synchronization raster is based on a channel raster range of a channel raster within the operating band, a duplex mode of the operating band, a bandwidth of an SSB, and a minimum guard band size.

12. The apparatus of claim 11, wherein the channel raster range for the operating band starts at 828334.

13. The apparatus of claim 11, wherein the minimum guard band size is based on the operating band, the duplex mode of the operating band, and a subcarrier spacing (SCS) of the SSB or a reference SCS associated with the operating band.

14. The apparatus of claim 11, wherein the cell search includes a candidate step size determination based on a minimum channel bandwidth (CBW) for the UE, the minimum guard band size, the duplex mode of the operating band, the bandwidth of the SSB, and a granularity of the synchronization raster.

15. The apparatus of claim 14, wherein the at least one processor is further configured to:

search each candidate that enables a global synchronization number (GSCN) interval of the minimum CBW having at least one SSB reference location, wherein the SSB reference location is at a center frequency of a corresponding SSB that maps to a GSCN index within the GSCN range of the synchronization raster associated with the operating band of the UE.

16. The apparatus of claim 15, wherein a starting point for the SSB reference location is positioned to minimize a number of samples outside of the GSCN interval of the minimum CBW.

17. The apparatus of claim 10, wherein the operating band has a range starting at 6425 MHz, and wherein the at least one processor is further configured to receive the SSB for the cell at the frequency based on the synchronization raster in the operating band, wherein the cell search is based on the SSB.

18. The apparatus of claim 10, wherein the at least one processor is further configured to communicate with a network node via the cell selected based on the cell search.

19. The apparatus of claim 10, further comprising:

at least one transceiver coupled to the at least one processor.

20. A method of wireless communication at a network node, comprising:

transmitting a synchronization signal and physical broadcast channel (PBCH) block (SSB) for a cell at a frequency in an operating band based on a global synchronization number (GSCN) range of a synchronization raster that starts at 9882 and based on a candidate step size of seven in a frequency domain; and communicating with at least one user equipment (UE) via the cell.

21. The method of claim 20, wherein the GSCN range for the synchronization raster is based on a channel raster range of a channel raster within the operating band, a duplex mode of the operating band, a bandwidth of the SSB, and a minimum guard band size.

22. The method of claim 21, wherein the minimum guard band size is based on the operating band, the duplex mode of the operating band and a subcarrier spacing (SCS) of the SSB or a reference SCS associated with the operating band.

23. The method of claim 21, wherein the frequency of the SSB is further based on a starting point within the GSCN range of the synchronization raster, the candidate step size being based on a minimum channel bandwidth (CBW) for the UE, the duplex mode of the operating band, the minimum guard band size, the bandwidth of the SSB, and a granularity of the synchronization raster.

24. The method of claim 21, wherein the channel raster range for the operating band starts at 828334.

25. An apparatus for wireless communication at a network node, comprising:

memory; and at least one processor coupled to the memory and configured to:

transmit a synchronization signal and physical broadcast channel (PBCH) block (SSB) for a cell at a frequency in an operating band based on a global synchronization channel number (GSCN) range of a synchronization raster that starts at 9882 and based on a candidate step size of seven in a frequency domain; and communicate with at least one user equipment (UE) via the cell.

26. The apparatus of claim 25, wherein the GSCN range for the synchronization raster is based on a channel raster range of a channel raster within the operating band, a duplex mode of the operating band, a bandwidth of the SSB, and a minimum guard band size.

27. The apparatus of claim 26, wherein the minimum guard band size is based on the operating band, the duplex mode of the operating band and a subcarrier spacing (SCS) of the SSB or a reference SCS associated with the operating band.

28. The apparatus of claim 26, wherein the frequency of the SSB is further based on a starting point within the GSCN range of the synchronization raster, the candidate step size being based on a minimum channel bandwidth (CBW) for the UE, the duplex mode of the operating band, the minimum guard band size, the bandwidth of the SSB, and a granularity of the synchronization raster.

29. The apparatus of claim 26, wherein the channel raster range for the operating band starts at 828334.

30. The apparatus of claim 25, further comprising:

at least one transceiver coupled to the at least one processor.

* * * * *